US008189806B2

(12) United States Patent
Yuzuriha et al.

(10) Patent No.: US 8,189,806 B2
(45) Date of Patent: May 29, 2012

(54) SOUND COLLECTION APPARATUS

(75) Inventors: Shin-ichi Yuzuriha, Osaka (JP); Takeo Kanamori, Osaka (JP)

(73) Assignee: Panasonic Corporation, Osaka (JP)

( * ) Notice: Subject to any disclaimer, the term of this patent is extended or adjusted under 35 U.S.C. 154(b) by 1063 days.

(21) Appl. No.: 12/092,396

(22) PCT Filed: Oct. 30, 2006

(86) PCT No.: PCT/JP2006/321653

§ 371 (c)(1),
(2), (4) Date: May 1, 2008

(87) PCT Pub. No.: WO2007/052604

PCT Pub. Date: May 10, 2007

(65) Prior Publication Data

US 2009/0154728 A1 Jun. 18, 2009

(30) Foreign Application Priority Data

Nov. 1, 2005 (JP) ................................ 2005-317916

(51) Int. Cl.
*H04B 15/00* (2006.01)

(52) U.S. Cl. ........ 381/92; 381/94.1; 381/94.5; 381/94.7

(58) Field of Classification Search .................... 381/92, 381/94.1, 94.5, 94.7
See application file for complete search history.

(56) References Cited

U.S. PATENT DOCUMENTS 3,942,126 A * 3/1976 Muraoka ....................... 327/557
4,675,906 A * 6/1987 Sessler et al. .................. 381/92
5,058,170 A * 10/1991 Kanamori et al. .............. 381/92
5,471,538 A * 11/1995 Sasaki et al. .................... 381/92
2004/0185804 A1* 9/2004 Kanamori et al. ......... 455/114.2

FOREIGN PATENT DOCUMENTS

JP 2001-204092 7/2001
JP 2002-084590 3/2002
JP 2002-271885 9/2002
JP 2004-187283 7/2004

OTHER PUBLICATIONS

International Search Report issued Feb. 6, 2007 in the International (PCT) Application of which the present application is the U.S. National Stage.

* cited by examiner

*Primary Examiner* — Hrayr A Sayadian
(74) *Attorney, Agent, or Firm* — Wenderoth Lind & Ponack, L.L.P.

(57) ABSTRACT

A sound collection apparatus includes a target sound collection unit that collects a sound including a target sound and outputs a collected-sound signal, a non-target sound collection unit, provided at positions different from each other, forms dead zones of sensitivity in a direction of the target sound source so as to collect a sound outside the dead zones and outputs a collected-sound signal. A sensitivity suppression unit generates a sensitivity suppression signal for suppressing a sound collection sensitivity in an overlap region in which dead zones overlap, as compared to a region surrounding the overlap region, by subjecting, to a predetermined signal processing, the collected-sound signal outputted by the non-target sound collection unit. An extraction unit removes, from the collected-sound signal, the sensitivity suppression signal generated, so as to extract a signal of a sound generated in the overlap region in which the dead zones overlap.

8 Claims, 18 Drawing Sheets

SOUND COLLECTION APPARATUS

BACKGROUND OF THE INVENTION

1. Technical Field

The present invention relates to a sound collection apparatus, and more particularly to a sound collection apparatus for collecting, with enhanced accuracy, only a target sound generated by a target sound source.

2. Background Art

Conventionally, widespread is a technique of collecting only a sound received from a specific direction and preventing collection of a sound received from a direction other than the specific direction, by utilizing a directivity of a microphone. Further, suggested is a technique of extracting only a sound generated in a specific region, instead of a sound received from a specific direction, by using the technique as described above (see, for example, Patent Document 1).

Hereinafter, a conventional sound collection apparatus in which the technique of extracting only a sound generated in a specific region is realized, will be described with reference to FIG. 17. FIG. 17 is a diagram schematically illustrating signal processing performed by the conventional sound collection apparatus. As shown in FIG. 17, a sound collection section 91 and a sound collection section 92 are each configured as a microphone array having a directivity. A sound source S shown in FIG. 17 is a sound source, positioned at a predetermined position, for generating a target sound to be collected. The sound collection section 91 is positioned such that the sound source S is positioned on a primary axis a910 representing the directivity of the sound collection section 91. A secondary axis a911 and a secondary axis a912 are each an axis oriented such that sensitivities are each −6 dB when a sensitivity to a sound received from the direction indicated by the primary axis a910 is 0 dB. A range between the secondary axis a911 and the secondary axis a912 is a range in which the sound collection section 91 indicates a sensitivity of −6 dB or more, and is a range of a main beam of the sound collection section 91. The range of the main beam of the sound collection section 91, which corresponds to the width of the main beam, represents an angular width between the secondary axis a911 and the secondary axis a912, and varies depending on an acuteness represented by the directivity of the sound collection section 91. The sound collection section 92 is positioned at a position different from that of the sound collection section 91 such that the sound source S is positioned on a primary axis a920 representing the directivity of the sound collection section 92. A secondary axis a921 and a secondary axis a922 are each an axis oriented such that sensitivities are each −6 dB when a sensitivity to a sound received from the direction indicated by the primary axis a920 is 0 dB. A range between the secondary axis a921 and the secondary axis a922 is a range in which the sound collection section 92 indicates a sensitivity of −6 dB or more, and is a range of a main beam of the sound collection section 92. The width of the main beam of the sound collection section 92 represents an angular width between the secondary axis a921 and the secondary axis a922, and varies depending on an acuteness represented by the directivity of the sound collection section 92.

A region A9 indicated by the horizontal lines is an overlap region in which the main beam formed between the secondary axis a911 and the secondary axis a912 and the main beam formed between the secondary axis a921 and the secondary axis a922 overlap each other. The region A9 includes the sound source S.

The conventional sound collection apparatus shown in FIG. 17 initially divides, into a plurality of frequency bands, a frequency band of a collected-sound signal of a sound collected by the sound collection section 91. Further, a frequency band of a collected-sound signal of a sound collected by the sound collection section 92 is also divided into a plurality of frequency bands. Next, the conventional sound collection apparatus subjects the collected-sound signals of the frequency bands obtained through the division to logical operation, so as to extract only a signal of a sound generated in the region A9. The region A9 includes the sound source S, and therefore the extracted signal includes a sound generated from the sound source S. Thus, the conventional sound collection apparatus extracts only the sound generated in the region A9, so as to collect only a target sound generated from the sound source S.

Patent Document 1: Japanese Laid-Open Patent Publication No. 2001-204092 (FIG. 2 and the like)

Here, a case where another sound source is provided, in the region A9 as described above, at a position other than that of the sound source S will be described. A sound generated from the another sound source is different from a target sound, and is a so-called disturbing sound. In this case, even when only a sound generated in the region A9 is extracted, the extracted signal may include the disturbing sound generated from the another sound source. Once the extracted signal includes a disturbing sound, it is technically difficult to separate the disturbing sound from the target sound. Therefore, as an alternative method for collecting, with enhanced accuracy, only the target sound generated from the sound source S, suggested is a method for reducing the size of the region A9 such that the another sound source is outside the region A9. In this method, it is necessary to reduce the width of a main beam of each of the sound collection section 91 and the sound collection section 92, and therefore the directivity of each of the sound collection section 91 and the sound collection section 92 needs to represent enhanced acuteness.

However, in order to enhance the acuteness represented by the directivity, it is necessary to increase the size of the microphone array forming each of the sound collection section 91 and the sound collection section 92. As a result, when, for example, the microphone array is allowed to have only a limited size, the enhancement of the acuteness represented by the directivity is limited.

Further, a case where each of the sound collection section 91 and the sound collection section 92 is configured as a microphone array of the superdirectivity of a secondary sound pressure gradient type so as to enhance the acuteness represented by the directivity will be described. In this case, the sound collection section 91 represents a polar pattern as shown in, for example, FIG. 18. FIG. 18 is a diagram illustrating a polar pattern represented by the sound collection section 91. The solid line in FIG. 18 represents the polar pattern, and represents a characteristic of a sensitivity varying in accordance with the direction from which the sound is received. Further, FIG. 18 shows the sensitivities for all directions (360 degrees). Furthermore, FIG. 18 shows a polar pattern obtained when the sound source S (not shown) outputs a target sound of a predetermined frequency (for example, 1 kHz). Further, in FIG. 18, the primary axis a910 represents 0 degree, and the sensitivity is 0 dB at the primary axis a910. The width of the main beam of the sound collection section 91 represents an angular width between the secondary axis a911 and the secondary axis a912, as described above. In FIG. 18, the width of the main beam is large and represents 90 degrees. Therefore, even when the microphone array of the superdirectivity is used, enhancement of the acuteness represented by the directivity is limited.

Thus, the enhancement of the acuteness represented by the directivity is limited, and therefore it is difficult to sufficiently reduce the size of the region A9 in which the main beam of the sound collection section 91 and the main beam of the sound collection section 92 overlap each other. As a result, the extracted signal may include a disturbing sound from another sound source, and it is difficult to collect, with enhanced accuracy, only the target sound from the sound source S.

Therefore, an object of the present invention is to provide a sound collection apparatus capable of collecting, with enhanced accuracy, only a target sound generated from a target sound source.

SUMMARY OF THE INVENTION

The present invention is directed to a sound collection apparatus, and, in order to achieve the above objects, the sound collection apparatus of the present invention comprises: at least one target sound collection means for collecting a sound including a target sound generated from a target sound source, so as to output a collected-sound signal; a plurality of non-target sound collection means, provided at positions different from each other, each forming a dead zone of a sensitivity in a direction of the target sound source so as to collect a sound outside the dead zone and output a collected-sound signal; sensitivity suppression means for generating a sensitivity suppression signal for suppressing a sound collection sensitivity in an overlap region in which a plurality of the dead zones overlap each other, as compared to in a region surrounding the overlap region, by subjecting, to a predetermined signal processing, the collected-sound signal outputted by each of the plurality of non-target sound collection means; and extraction means for removing, from the collected-sound signal outputted by the at least one target sound collection means, the sensitivity suppression signal generated by the sensitivity suppression means, so as to extract a signal of a sound generated in the overlap region in which the plurality of the dead zones overlap each other.

Therefore, the overlap region of the dead zones having a narrow range is used, so that only a target sound can be more accurately collected than in the conventional art even when a sound source other than that for a target sound is provided near a target sound source.

Preferably, a plurality of the collected-sound signals outputted by the plurality of non-target sound collection means are time-domain signals, respectively, and the sensitivity suppression means may include: conversion means for performing a conversion from the time-domain collected-sound signals outputted by the plurality of non-target sound collection means, to frequency-domain collected-sound signals, respectively; calculation means for performing, in units of frequencies, a calculation for obtaining amplitude levels of the frequency-domain collected-sound signals obtained through the conversion performed by the conversion means; and addition means for performing, in units of the frequencies, an addition of the amplitude levels of the frequency-domain collected-sound signals, the amplitude levels being obtained through the calculation performed by the calculation means, and outputting, as the sensitivity suppression signal, a signal obtained through the addition. The conversion means includes the number of frequency conversion sections equal to the non-target sound collection sections, and the frequency conversion sections will be described below in embodiments. Further, the calculation means includes the number of level calculation sections equal to the non-target sound collection sections, and the level calculation sections will be described below in the embodiments.

Therefore, it is possible to securely reduce sensitivity of a signal extracted by the extraction means to a disturbing sound generated in a region other than the overlap region of the dead zones.

The sensitivity suppression means may further include adjustment means for performing, in units of the frequencies, an adjustment of the amplitude levels of the frequency-domain collected-sound signals, the amplitude levels being obtained through the calculation performed by the calculation means, and the addition means may perform, in units of the frequencies, an addition of amplitude levels of the frequency-domain collected-sound signals, the amplitude levels being obtained through the adjustment performed by the adjustment means, and outputs, as the sensitivity suppression signal, a signal obtained through the addition. The adjustment means includes the number of level adjustment sections equal to the non-target sound collection sections, and the level adjustment sections will be described below in the embodiment.

Therefore, the sensitivity suppression signal is generated so as to suppress a sensitivity in the overlap region of the dead zones, and represent, in any contour, the sensitivity distribution in other regions. As a result, it is possible to improve a performance of removing, by the extraction means, a disturbing sound generated in a region other than the overlap region of the dead zones.

Preferably, a plurality of the collected-sound signals outputted by the plurality of non-target sound collection means are time-domain signals, respectively, and the sensitivity suppression means may include: conversion means for performing a conversion from the time-domain collected-sound signals outputted by the plurality of non-target sound collection means, to frequency-domain collected-sound signals, respectively; calculation means for performing, in units of frequencies, a calculation for obtaining power levels of the frequency-domain collected-sound signals obtained through the conversion performed by the conversion means; and addition means for performing, in units of the frequencies, an addition of the power levels of the frequency-domain collected-sound signals, the power levels being obtained through the calculation performed by the calculation means, and outputting, as the sensitivity suppression signal, a signal obtained through the addition. The conversion means includes the number of frequency conversion sections equal to the non-target sound collection sections, and the frequency conversion sections will be described below in the embodiments. Further, the calculation means includes the number of level calculation sections equal to the non-target sound collection sections, and the level calculation sections will be described below in the embodiments.

Therefore, it is possible to securely reduce a sensitivity of a signal extracted by the extraction means to a disturbing sound generated in a region other than the overlap region of the dead zones.

Preferably, a plurality of the target sound collection means may be provided, and the plurality of the target sound collection means may be provided at positions different from each other such that the target sound source is provided in front thereof, and the plurality of the target sound collection means have respective directivities each representing a direction of the target sound source, and primary axes representing the respective directivities of the plurality of the target sound collection means may intersect each other at a position slightly off the target sound source toward the plurality of the target sound collection means.

Therefore, a sensitivity of a signal extracted by the extraction means can be sufficiently reduced in the forward direction from the target sound source.

The present invention is also directed to a sound collection method, and, in order to achieve the above objects, the sound collection method of the present invention comprises: a target sound collection step of collecting, by using first sound collection means, a sound including a target sound generated from a target sound source, so as to output a collected-sound signal; a positioning step of positioning a plurality of second sound collection means at positions different from each other such that the plurality of second sound collection means each form a dead zone of a sensitivity in a direction of the target sound source; a non-target sound collection step of collecting a sound outside the dead zone by using the plurality of second sound collection means positioned in the positioning step, so as to output collected-sound signals; a sensitivity suppression step of generating a sensitivity suppression signal for suppressing a sound collection sensitivity in an overlap region in which a plurality of the dead zones overlap each other, as compared to in a region surrounding the overlap region, by subjecting, to a predetermined signal processing, the collected-sound signals outputted in the non-target sound collection step; and extraction step of removing, from the collected-sound signal outputted in the target sound collection step, the sensitivity suppression signal generated in the sensitivity suppression step, so as to extract a signal of a sound generated in the overlap region in which the plurality of the dead zones overlap each other.

The present invention is also directed to an integrated circuit, and, in order to achieve the above objects, the integrated circuit of the present invention comprises: a first input terminal for receiving a collected-sound signal outputted by at least one target sound collection means for collecting a sound including a target sound generated from a target sound source; a plurality of second input terminals for receiving collected-sound signals outputted by a plurality of non-target sound collection means, respectively, and the plurality of non-target sound collection means are provided at positions different from each other, and each form a dead zone of a sensitivity in a direction of the target sound source so as to collect a sound outside the dead zone; sensitivity suppression means for generating a sensitivity suppression signal for suppressing a sound collection sensitivity in an overlap region in which a plurality of the dead zones overlap each other, as compared to in a region surrounding the overlap region, by subjecting, to a predetermined signal processing, the collected-sound signals outputted from the plurality of second input terminals, respectively; extraction means for removing, from the collected-sound signal outputted from the first input terminal, the sensitivity suppression signal generated by the sensitivity suppression means, so as to extract a signal of a sound generated in the overlap region in which the plurality of the dead zones overlap each other; and an output terminal for outputting the signal of the sound which is generated in the overlap region in which the plurality of the dead zones overlap each other, and is extracted by the extraction means.

The present invention is also directed to a program for causing a computer, of a sound collection apparatus including: at least one target sound collection means for collecting a sound including a target sound generated from a target sound source, so as to output a collected-sound signal; and a plurality of non-target sound collection means, provided at positions different from each other, each forming a dead zone of a sensitivity in a direction of the target sound source so as to collect a sound outside the dead zone and output a collected-sound signal, to perform execution, and, in order to achieve the above objects, the program of the present invention causes the computer to execute: a sensitivity suppression step of generating a sensitivity suppression signal for suppressing a sound collection sensitivity in an overlap region in which a plurality of the dead zones overlap each other, as compared to in a region surrounding the overlap region, by subjecting, to a predetermined signal processing, the collected-sound signal outputted by each of the plurality of non-target sound collection means; and an extraction step of removing, from the collected-sound signal outputted by the at least one target sound collection means, the sensitivity suppression signal generated in the sensitivity suppression step, so as to extract a signal of a sound generated in the overlap region in which the plurality of the dead zones overlap each other.

The present invention is also directed to a storage medium, and, in order to achieve the above objects, the storage medium of the present invention is a computer-readable storage medium having the program stored therein.

According to the present invention, dead zones of sensitivity, which are formed by the plurality of non-target sound collection means, are used such that a sensitivity suppression signal is generated so as to suppress a sound collection sensitivity in the overlap region in which the dead zones overlap each other, as compared to in a region surrounding the overlap region. Ranges of the dead zones are each narrower than the range of each main beam. Accordingly, the overlap region in which the dead zones overlap each other is narrower than a region in which the main beams overlap each other. Consequently, only a target sound can be more accurately collected than in the conventional art even when a sound source other than that for a target sound is provided near a target sound source.

DESCRIPTION OF THE REFERENCE CHARACTERS

Figure 1:
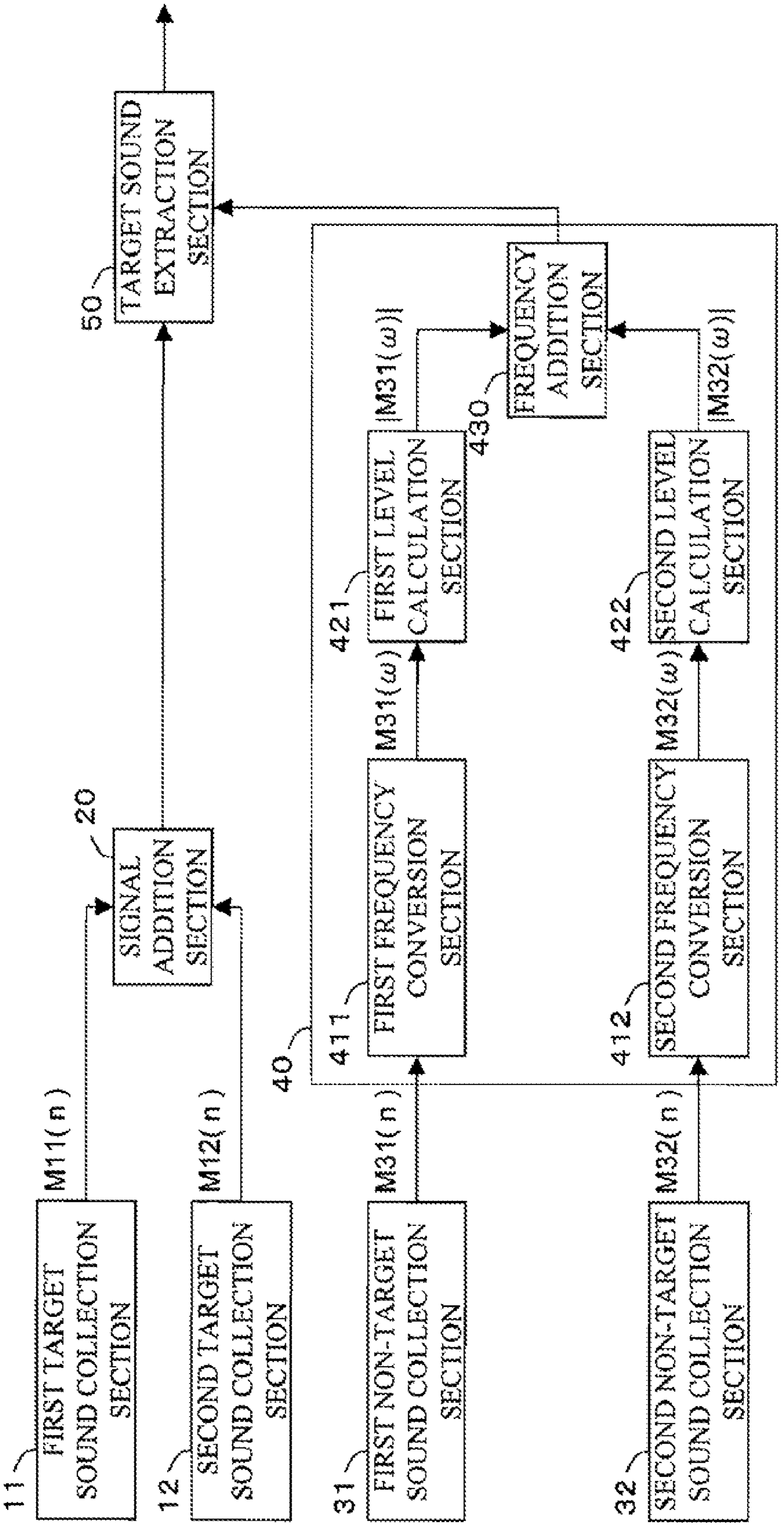
FIG. 1 is a block diagram illustrating a configuration of a sound collection apparatus according to a first embodiment of the present invention.

11, 11*a* first target sound collection section
12,12*a* second target sound collection section
20 signal addition section
31 first non-target sound collection section
32 second non-target sound collection section
33 N-th non-target sound collection section
40, 40*a*, 40*b* sensitivity suppression processing section
411 first frequency conversion section
412 second frequency conversion section
413 N-th frequency conversion section
421 first level calculation section
422 second level calculation section
423 N-th level calculation section
430 frequency addition section
441 first level adjustment section
442 second level adjustment section
50 target sound extraction section

DETAILED DESCRIPTION OF THE INVENTION

Hereinafter, embodiments of the present invention will be described with reference to the drawings.

(First Embodiment)

With reference to FIG. 1, a configuration of a sound collection apparatus according to a first embodiment of the present invention will be described. FIG. 1 is a block diagram illustrating the configuration of the sound collection apparatus according to the first embodiment of the present invention. The sound collection apparatus according to the present embodiment comprises a first target sound collection section 11, a second target sound collection section 12, a signal addition section 20, a first non-target sound collection section 31, a second non-target sound collection section 32, a sensitivity suppression processing section 40, and a target sound extraction section 50.

Figure 2:
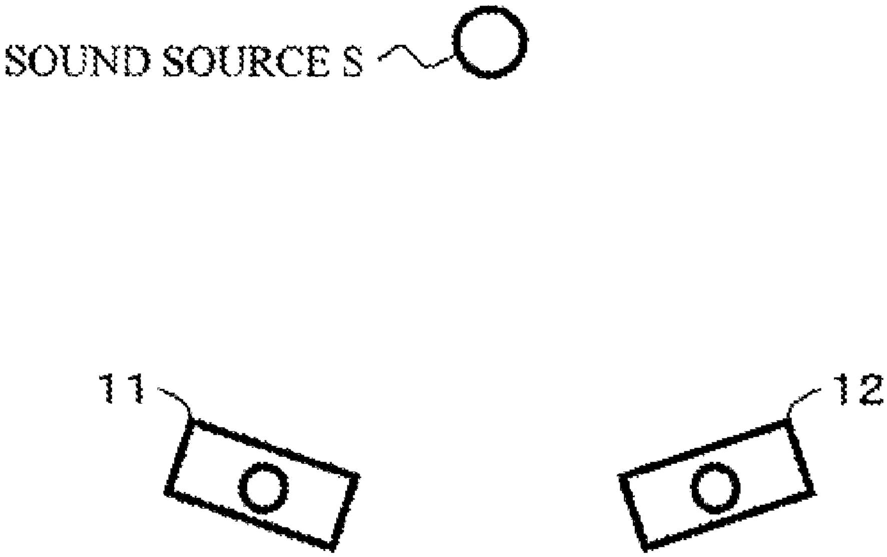
FIG. 2 is a diagram illustrating an exemplary positioning of a first target sound collection section 11 and a second target sound collection section 12.

The first target sound collection section 11 and the second target sound collection section 12 are positioned, for example, as shown in FIG. 2. FIG. 2 is a diagram illustrating an exemplary positioning of the first target sound collection section 11 and the second target sound collection section 12. The sound source S shown in FIG. 2 is a sound source, positioned at a predetermined position, for generating a target sound to be collected.

The first target sound collection section 11 includes a microphone array having a sensitivity to a target sound generated from the sound source S. The first target sound collection section 11 collects at least the target sound generated from the sound source S, and converts the collected target sound to a collected-sound signal M11($n$) (n represents a sample number of a time signal), which is an electrical signal. The collected-sound signal M11($n$) is a time-domain signal, and is outputted to the signal addition section 20.

The microphone array having a sensitivity to a target sound generated from the sound source S is, for example, a microphone array having an omnidirectional characteristic. The omnidirectional characteristic represents a pattern of the sensitivity characteristic that sensitivities to sounds received from all directions are substantially equal to each other. The sensitivity characteristic represents a characteristic of a sensitivity which varies depending on a direction from which a sound is received, and represents the polar pattern as described above. The microphone array having the omnidirectional characteristic includes, for example, a plurality of microphones each having an omnidirectional characteristic. The microphone array having the omnidirectional characteristic may include a plurality of microphones, and also include an acoustic circuit or an electric circuit for intentionally preventing formation of a directivity. Further, the first target sound collection section 11 may be configured as a single microphone instead of a microphone array.

The second target sound collection section 12 has the same configuration as the first target sound collection section 11 described above. The second target sound collection section 12 collects at least the target sound generated from the sound source S, and converts the collected target sound to a collected-sound signal M12($n$), which is an electrical signal. The collected-sound signal M12($n$) is a time-domain signal, and is outputted to the signal addition section 20. The signal addition section 20 adds the collected-sound signal M11($n$) and the collected-sound signal M12($n$), and outputs, to the target sound extraction section 50, the collected-sound signal (M11($n$)+M12($n$)) obtained through the addition.

The first non-target sound collection section 31 is a microphone array which has a directivity and forms a dead zone of a sensitivity in the direction of the sound source S. The first non-target sound collection section 31 collects a sound generated outside the dead zone, and converts the collected sound to a collected-sound signal M31($n$), which is an electrical signal. The collected-sound signal M31($n$) is a time-domain signal, and is outputted to the sensitivity suppression processing section 40.

The microphone array having a directivity is a microphone array having a sensitivity enhanced in a specific direction. The microphone array having the directivity may include a plurality of microphones, and also include an acoustic circuit or an electric circuit for intentionally enhancing the sensitivity in a specific direction. Alternatively, the first non-target sound collection section 31 may be configured as a single microphone having a directivity, instead of a microphone array.

The second non-target sound collection section 32 has the same configuration as the first non-target sound collection section 31 described above. The second non-target sound collection section 32 collects a sound generated outside the dead zone, and converts the collected sound to a collected-sound signal M32(*n*), which is an electrical signal. The collected-sound signal M32(*n*) is a time-domain signal, and is outputted to the sensitivity suppression processing section 40.

Figure 3:
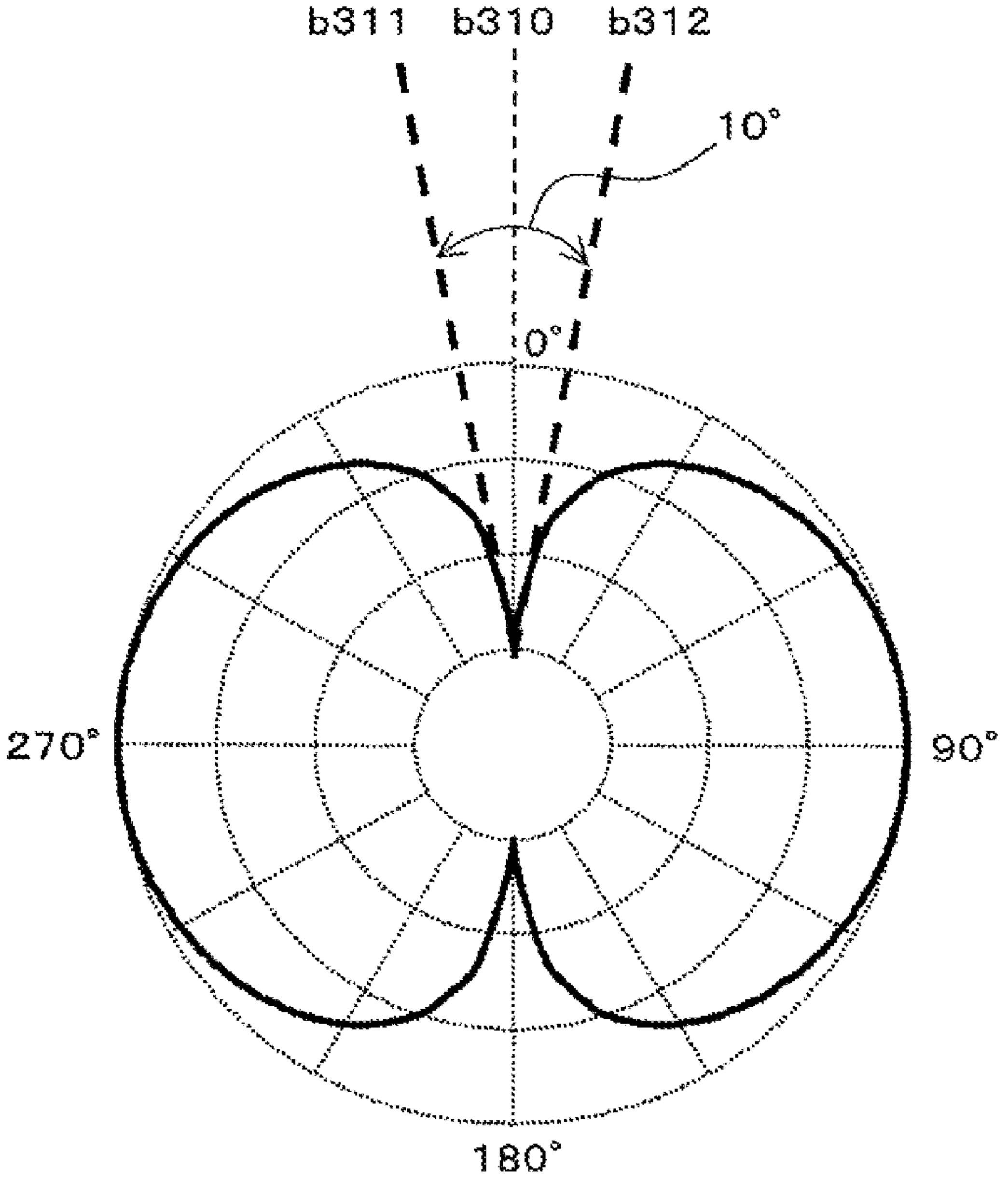
FIG. 3 is a diagram illustrating a polar pattern represented by a first non-target sound collection section 31.

With reference to FIG. 3, sensitivity characteristic represented by the first non-target sound collection section 31 will be specifically described. FIG. 3 is a diagram illustrating a polar pattern represented by the first non-target sound collection section 31. The solid line in FIG. 3 represents the polar pattern representing characteristic of sensitivity varying depending on a direction from which a sound is received. Further, FIG. 3 shows the sensitivity for all directions (360 degrees). Still further, FIG. 3 shows the sensitivity characteristic obtained when the first non-target sound collection section 31 is configured as a bidirectional microphone array. Furthermore, FIG. 3 shows a polar pattern obtained when the sound source S (not shown) generates a target sound of a predetermined frequency (for example, 1 kHz). Moreover, FIG. 3 shows that an axis b310 at which a minimum sensitivity is obtained represents 0 degree. The axis b310 represents a direction in which the sensitivity is minimum, and is a primary axis of the dead zone. An axis b311 and an axis b312 are each a secondary axis of the dead zone, and each represent a direction in which the sensitivity is reduced by a predetermined amount (for example, by 20 dB) when the sensitivity represents a maximum sensitivity of 0 dB in the direction of 90 degrees and the direction of 270 degrees. A range between the secondary axis b311 and the secondary axis a312 is a range in which the sensitivity obtained by the first non-target sound collection section 31 is reduced by the predetermined amount (for example, 20 dB), and a dead zone is formed. In other words, the dead zone is a range in which no sensitivity is obtained. The range of the dead zone, that is, the width of the dead zone is represented as an angular width between the secondary axis b311 and the secondary axis b312. Therefore, in FIG. 3, the width of the dead zone represents about 10 degrees. Thus, the width of the dead zone is substantially reduced as compared to the width of a main beam. The bidirectional sensitivity characteristic shown in FIG. 3 indicates that the dead zones are formed in the directions of 0 degrees and 180 degrees. Thus, the sensitivity characteristic indicates that the dead zone is formed in any direction in which the sensitivity is reduced from the maximum sensitivity by a predetermined amount (for example, 20 dB) or more. The sensitivity characteristic other than the bidirectional sensitivity characteristic also indicates that the width of the dead zone is substantially reduced as compared to the width of the main beam.

Figure 4:
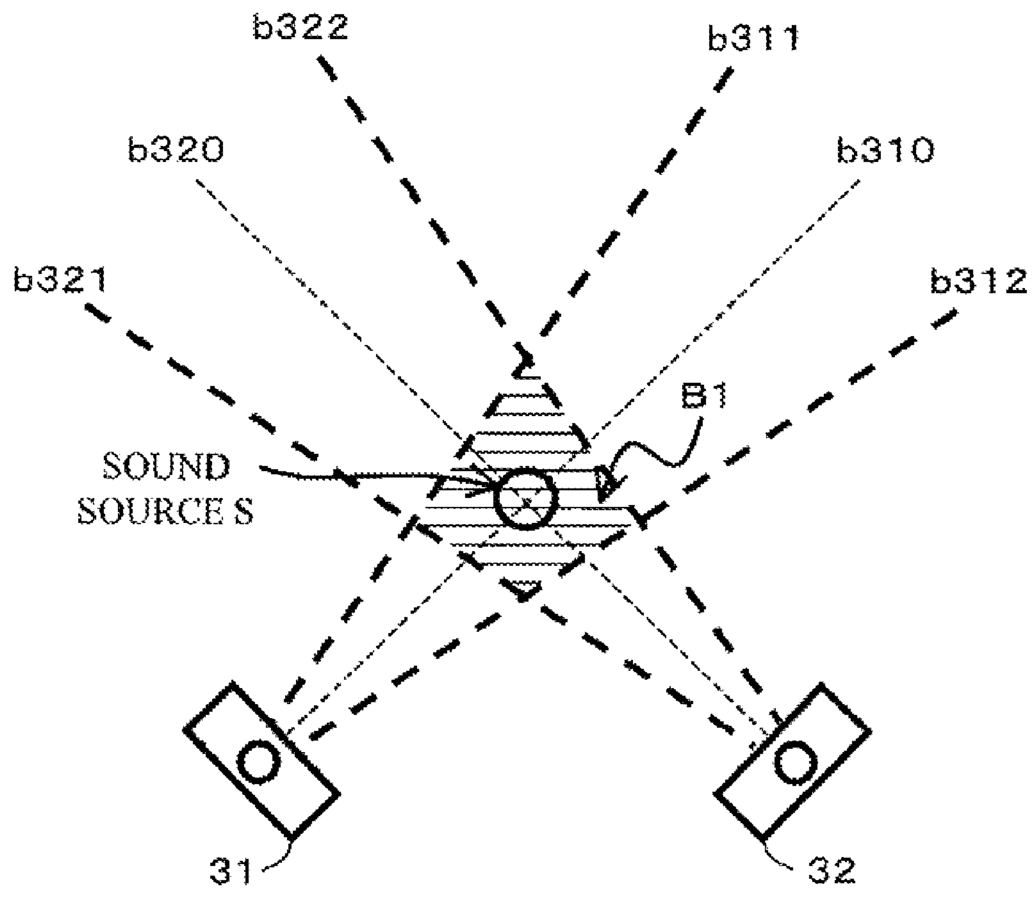
FIG. 4 is a diagram illustrating an exemplary positioning of the first non-target sound collection section 31 and a second non-target sound collection section 32.

With reference to FIG. 4, a relationship between the respective dead zones formed by the first non-target sound collection section 31 and the second non-target sound collection section 32, and positioning of the first non-target sound collection section 31 and the second non-target sound collection section 32 will be specifically described. FIG. 4 is a diagram illustrating an exemplary positioning of the first non-target sound collection section 31 and the second non-target sound collection section 32. The sound source S shown in FIG. 4 is the same as the sound source S shown in FIG. 2.

In FIG. 4, the first non-target sound collection section 31 is provided such that the sound source S is positioned on the primary axis b310 of the dead zone. The first non-target sound collection section 31 is positioned such that the angular width, including the primary axis b310, between the secondary axis b311 and the secondary axis b312 corresponds to the width of the dead zone. The range, including the primary axis b310, between the secondary axis b311 and the secondary axis b312, is the range of the dead zone. Therefore, the first non-target sound collection section 31 collects a sound generated outside the dead zone. The second non-target sound collection section 32 is positioned at a position different from that of the first non-target sound collection section 31, as shown in FIG. 4. The axis b320 is a primary-axis of the dead zone of the second non-target sound collection section 32, and the axis b321 and the axis b322 are each the secondary axis of the dead zone. The second non-target sound collection section 32 is positioned such that the sound source S is positioned on the primary axis b320 of the dead zone. The second non-target sound collection section 32 is positioned such that the angular width, including the primary axis b320, between the secondary axis b321 and the secondary axis b322 corresponds to the width of the dead zone. The range, including the primary axis b320, between the secondary axis b321 and the secondary axis b322, is the range of the dead zone. Therefore, the second non-target sound collection section 32 collects a sound generated outside the dead zone.

Figure 17:
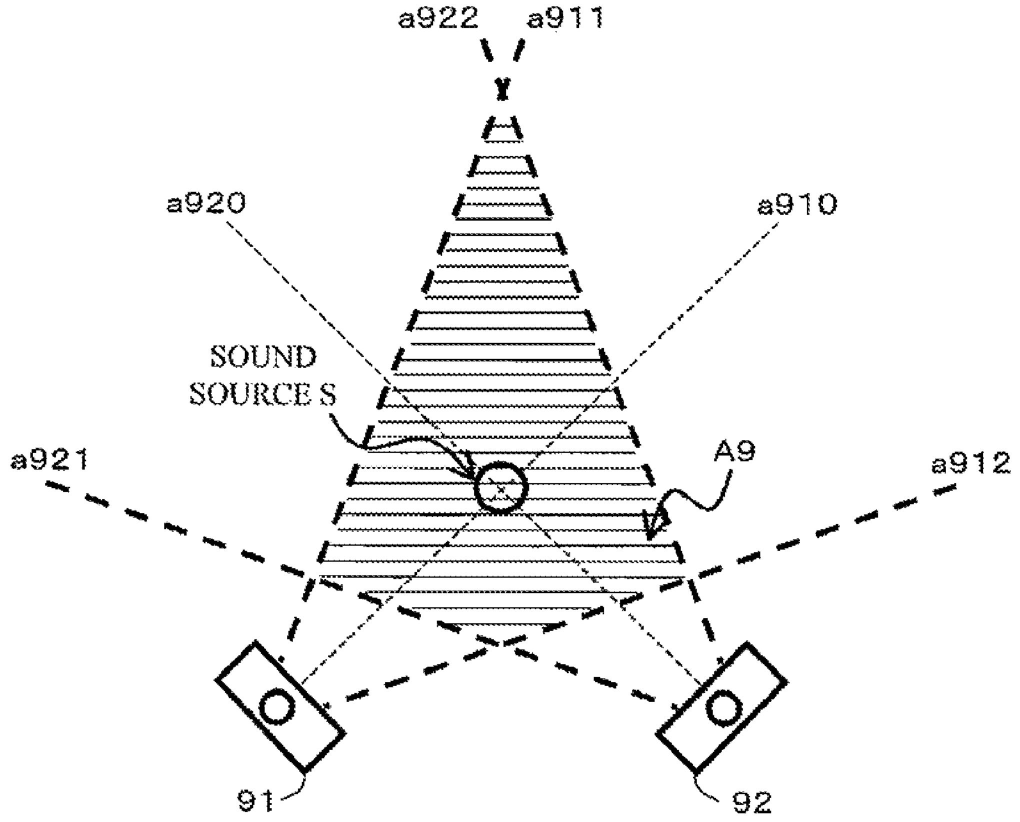
FIG. 17 is a diagram schematically illustrating signal processing performed by a conventional sound collection apparatus.
Figure 18:
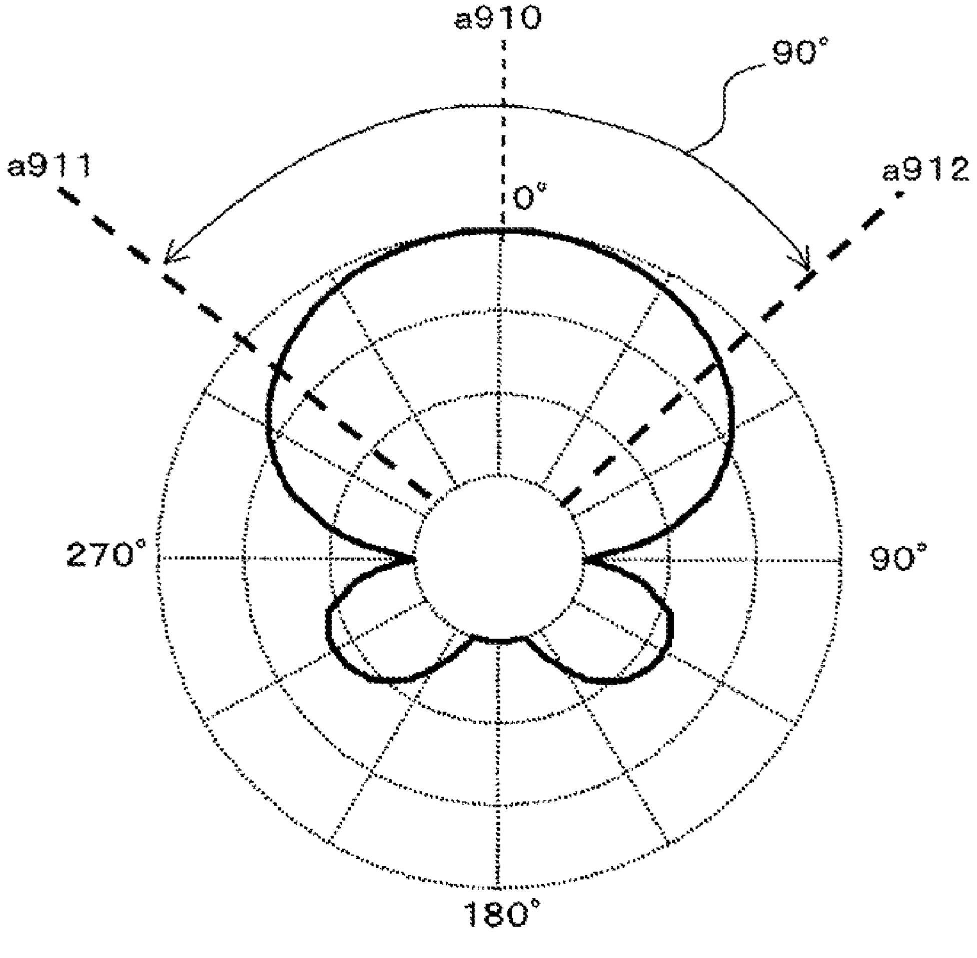
FIG. 18 is a diagram illustrating a polar pattern represented by a sound collection section 91.

The region B1 indicated by horizontal lines is an overlap region in which the dead zone formed between the secondary axis b311 and the secondary axis b312, and the dead zone formed between the secondary axis b321 and the secondary axis b322 overlap each other. The region B1, which is a region in which the dead zones each having a narrow width overlap each other, is narrower than the region A9, as shown in FIG. 17, in which the main beams overlap each other.

Although, in FIG. 4, each of the first non-target sound collection section 31 and the second non-target sound collection section 32 are positioned such that the sound source S is positioned on the primary axis of the dead zone, the present invention is not limited thereto. Each of the first non-target sound collection section 31 and the second non-target sound collection section 32 may be positioned such that the sound source S is at least included in the dead zone.

The sensitivity suppression processing section 40 subjects the collected-sound signal M31(*n*) and the collected-sound signal M32(*n*) to a predetermined signal processing such that a sensitivity suppression signal is generated so as to suppress a sound collection sensitivity in the region B1 in which the dead zones overlap each other, as compared to in regions surrounding the region B1. That is, the sensitivity suppression processing section 40 generates a sensitivity suppression signal so as to provide such a sound collection sensitivity that the region B1 is a dead zone of the sensitivity. The generated sensitivity suppression signal is outputted to the target sound extraction section 50.

Hereinafter, referring again to FIG. 1, the signal processing performed by the sensitivity suppression processing section 40 will be specifically described. As shown in FIG. 1, the sensitivity suppression processing section 40 comprises a first frequency conversion section 411, a second frequency conversion section 412, a first level calculation section 421, a second level calculation section 422, and a frequency addition section 430.

The first frequency conversion section 411 converts the collected-sound signal M31(*n*) outputted by the first non-target sound collection section 31 to a frequency-domain collected-sound signal M31(ω) by using frequency transform technique such as Fourier transform or wavelet transform. ω represents a frequency. That is, the collected-sound signal M31(ω) is a signal obtained for each frequency ω. The collected-sound signal M31(ω) is outputted to the first level calculation section 421.

The first level calculation section 421 calculates, for each frequency ω, an amplitude level |M31(ω)| of the collected-sound signal M31(ω) outputted by the first frequency conversion section 411. The amplitude level |M31(ω)| is obtained for each frequency ω. The amplitude level |M31(ω)| is outputted to the frequency addition section 430.

The second frequency conversion section 412 converts the collected-sound signal M32(*n*) outputted by the second non-target sound collection section 32 to a frequency-domain collected-sound signal M32(ω) by using frequency transform technique such as Fourier transform or wavelet transform. The collected-sound signal M31(ω) is a signal obtained for each frequency ω, and is outputted to the second level calculation section 422.

The second level calculation section 422 calculates, for each frequency ω, an amplitude level |M32(ω)| of the collected-sound signal M32 (ω) outputted by the second frequency conversion section 412. The amplitude level |M32 (ω)| is obtained for each frequency ω. The amplitude level |M32 (ω)| is outputted to the frequency addition section 430.

The frequency addition section 430 adds the amplitude level |M31 (ω)| and the amplitude level |M32(ω)|. A signal obtained through the addition by the frequency addition section 430 is represented as |M31 (ω)|+|M32(ω)|. The frequency addition section 430 performs the addition for each frequency ω. For example, a signal obtained through the addition for frequency ω1 is represented as |M31(ω1)|+|M32 (ω1)|. The signal obtained through the addition by the frequency addition section 430 is a signal obtained by adding the amplitude level of the collected-sound signal outputted by the first non-target sound collection section 31 and the amplitude level of the collected-sound signal outputted by the second non-target sound collection section 32. Therefore, the signal obtained through the addition by the frequency addition section 430 is a sensitivity suppression signal generated so as to suppress the sound collection sensitivity in the region B1 in which the dead zones overlap each other, as compared to in a region surrounding the region B1. The sensitivity suppression signal is a signal obtained for each frequency ω, and is outputted to the target sound extraction section 50.

Although each of the first level calculation section 421 and the second level calculation section 422 calculates an amplitude level, each of the first level calculation section 421 and the second level calculation section 422 may calculate a power level instead of calculating an amplitude level. For example, when the first level calculation section 421 calculates a power level, the power level obtained through the calculation is represented as |M31(ω)|^2. In this case, the sensitivity suppression signal is represented as |M31(ω)|^2+|M32(ω)|^2.

Thus, the sensitivity suppression processing section 40 generates the sensitivity suppression signal by using one of the amplitude level or the power level both of which represent amplitude information. Therefore, it is possible to generate the sensitivity suppression signal including no phase information.

The sensitivity suppression processing section 40 may generate the sensitivity suppression signal without converting, to a frequency-domain signal, the time-domain collected-sound signal outputted by each of the non-target sound collection sections or without calculating the amplitude level or the power level of the frequency-domain signal obtained through the conversion. In this case, the sensitivity suppression signal is represented as M31(*n*)+M32(*n*) or M31(ω)+M32(ω). The time-domain sensitivity suppression signal (M31(*n*)+M32(*n*)) and the frequency-domain sensitivity suppression signal (M31(ω)+M32(ω)) each include the amplitude information and the phase information.

The time-domain sensitivity suppression signal (M31(*n*)+M32(*n*)) and the frequency-domain sensitivity suppression signal (M31(ω)+M32(ω)) each include the amplitude information and the phase information, as described above. Each of the non-target sound collection means have a directivity, and therefore, the sensitivity characteristic is such that a phase of the collected-sound signal collected from the main beam may be different from a phase of the collected-sound signal collected from a side beam. In this case, the collected-sound signals may sometimes cancel each other. In particular, when the collected-sound signals are in opposite phase to each other, the collected-sound signals may completely cancel each other. Thus, when the sensitivity suppression signal is, for example, a signal including the phase information, such as a signal obtained through the addition based on the time-domain, the collected-sound signals interfere with each other in accordance with the phase information, and the reduction in sensitivity may occur also in an unexpected region other than the region B1 in which the dead zones overlap each other. On the other hand, when the sensitivity suppression signal is generated by using one of the amplitude level and the power level both of which represent the amplitude information, the exclusion of the phase information prevents the interference as described above. Therefore, when the sensitivity suppression signal is generated by using one of the amplitude level and the power level both of which represent the amplitude information, the reduction of the sensitivity is prevented in the unexpected region. Thus, when the amplitude level or the power level is used, it is possible to generate the sensitivity suppression signal so as to suppress, with enhance accuracy, the sensitivity in the region B1 in which the dead zones overlap each other. That is, when the amplitude level or the power level is used, it is possible to securely form the region B1 from which a target sound is not collected.

The target sound extraction section 50 remove, from an output signal (M11(*n*)+M12(*n*)) of the signal addition section 20, the sensitivity suppression signal (|M31(ω)|+|M32(ω) or (|M31(ω)|^2+|M32(ω)|^2) of the sensitivity suppression processing section 40. The output signal of the signal addition section 20 includes both the target sound and a disturbing sound other than the target sound. On the other hand, the sensitivity suppression signal of the sensitivity suppression processing section 40 includes only the disturbing sound generated outside the region B1 in which the dead zones overlap each other. Therefore, the target sound extraction section 50 removes, from the output signal of the signal addition section 20, the sensitivity suppression signal of the sensitivity suppression processing section 40, so as to extract a sound generated in the region B1 in which the dead zones overlap each other. The region B1 in which the dead zones overlap each other is narrower than the region in which main beams overlap each other in the conventional art. Therefore, the sound extracted by the target sound extraction section 50 is increasingly closer to a sound generated from the sound source S. That is, in the present embodiment, only the sound generated from the sound source S may be collected more accurately than in the conventional art.

The target sound extraction section 50 performs the removal processing by using a noise suppression technique such as spectrum subtraction or Wiener filter. Hereinafter, a process in which the spectrum subtraction is used as the noise suppression technique, and a process in which the Wiener filter is used for the noise suppression technique will be specifically described as an example.

When the spectrum subtraction is used as the noise suppression technique, the removal processing is performed based on the frequency-domain. Therefore, the target sound extraction section 50 calculates the power level (|M11(ω)|^2+|M12(ω)|^2) of the frequency-domain signal based on the output signal (M11(*n*)+M12(*n*)) of the signal addition section 20. The signal (|M31(ω)|^2+|M32(ω)|^2) calculated by using the power level is used as the sensitivity suppression signal outputted by the sensitivity suppression processing section 40. The target sound extraction section 50 subtracts the sensitivity suppression signal (|M31(ω)|^2+|M32(ω)|^2) from the output signal (|M11(ω)|^2+|M12(ω)|^2) of the signal addition section 20. Thus, the removal processing is realized.

When the Wiener filter is used for the noise suppression technique, the removal processing is performed based on the time-domain. Initially, the target sound extraction section 50 calculates the power level (|M11(ω)|^2+|M12(ω)|^2) of the frequency-domain signal based on the output signal (M11(*n*)+M12(*n*)) of the signal addition section 20. The signal (|M31(ω)|^2+|M32(ω)|^2) calculated by using the power level is used as the sensitivity suppression signal outputted by the sensitivity suppression processing section 40. The target sound extraction section 50 subtracts the sensitivity suppression signal (|M31(ω)|^2+|M32(ω)|^2) from the output signal (|M11(ω)|^2+|M12(ω)|^2) of the signal addition section 20, and normalizes the result obtained through the subtraction. The target sound extraction section 50 converts the result of the normalization so as to be based on the time-domain, and sets, as a filter, the result obtained through the conversion. Thus, the target sound extraction section 50 has set therein a filter for suppressing only a signal corresponding to the sensitivity suppression signal in the time-domain output signal received from the signal addition section 20. The target sound extraction section 50 performs filtering based on the set filter, and therefore it is possible remove only the sensitivity suppression signal from the output signal of the signal addition section 20. Thus, the removal processing is realized.

Next, with reference to FIGS. 5 to 9, a result of the signal processing described above will be described. FIGS. 5 to 9 are each a diagram illustrating an exemplary result of a simulation of the sensitivity distribution of a signal described below. In FIGS. 5 to 9, the ordinate axis and the abscissa axis are each a coordinate axis representing a distance (cm). Further, in FIGS. 5 to 9, the sound source S is positioned at a position represented as coordinates (0, 0). Further, in FIGS. 5 to 9, the solid lines on the coordinate system are each obtained by connecting coordinate points at which the same sound pressure sensitivity is obtained, and are spaced at intervals of 6 dB.

Figure 5:
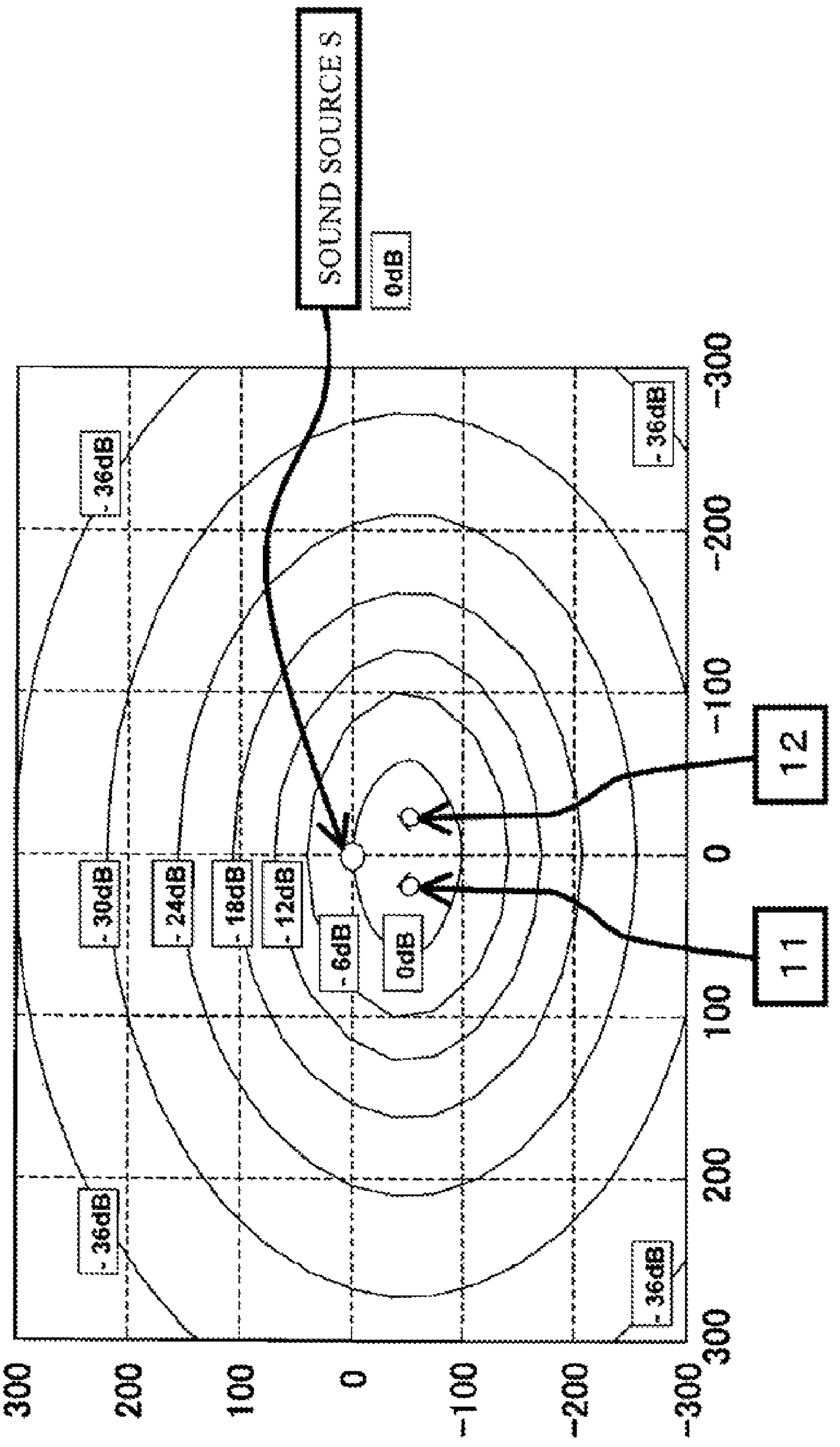
FIG. 5 is a diagram illustrating a sensitivity distribution represented by an output signal of a signal addition section 20.

FIG. 5 is a diagram illustrating a sensitivity distribution represented by the output signal (M11(*n*)+M12(*n*)) of the signal addition section 20. In FIG. 5, the first target sound collection section 11 and the second target sound collection section 12 are positioned such that the sound source S positioned at the position represented as coordinates (0,0) is in front thereof. The output signal of the signal addition section 20 is a signal obtained by adding the collected-sound signal collected by the first target sound collection section 11 and the collected-sound signal collected by the second target sound collection section 12. Therefore, the sensitivity distribution shown in FIG. 5 is obtained by combining the sensitivity distribution represented by the first target sound collection section 11 with the sensitivity distribution represented by the second target sound collection section 12. The omnidirectional microphone array is used for each of the first target sound collection section 11 and the second target sound collection section 12. Therefore, as can be seen from the sensitivity distribution shown in FIG. 5, the larger the distance from each of the first target sound collection section 11 and the second target sound collection section 12 is, the more greatly the sensitivity is reduced in all directions in a uniform manner. As can be seen from the sensitivity distribution shown in FIG. 5, the sensitivity to a sound generated from the sound source S is 0 dB. Therefore, it can be seen that each of the first target sound collection section 11 and the second target sound collection section 12 collect at least a sound generated from the sound source S.

Figure 6:
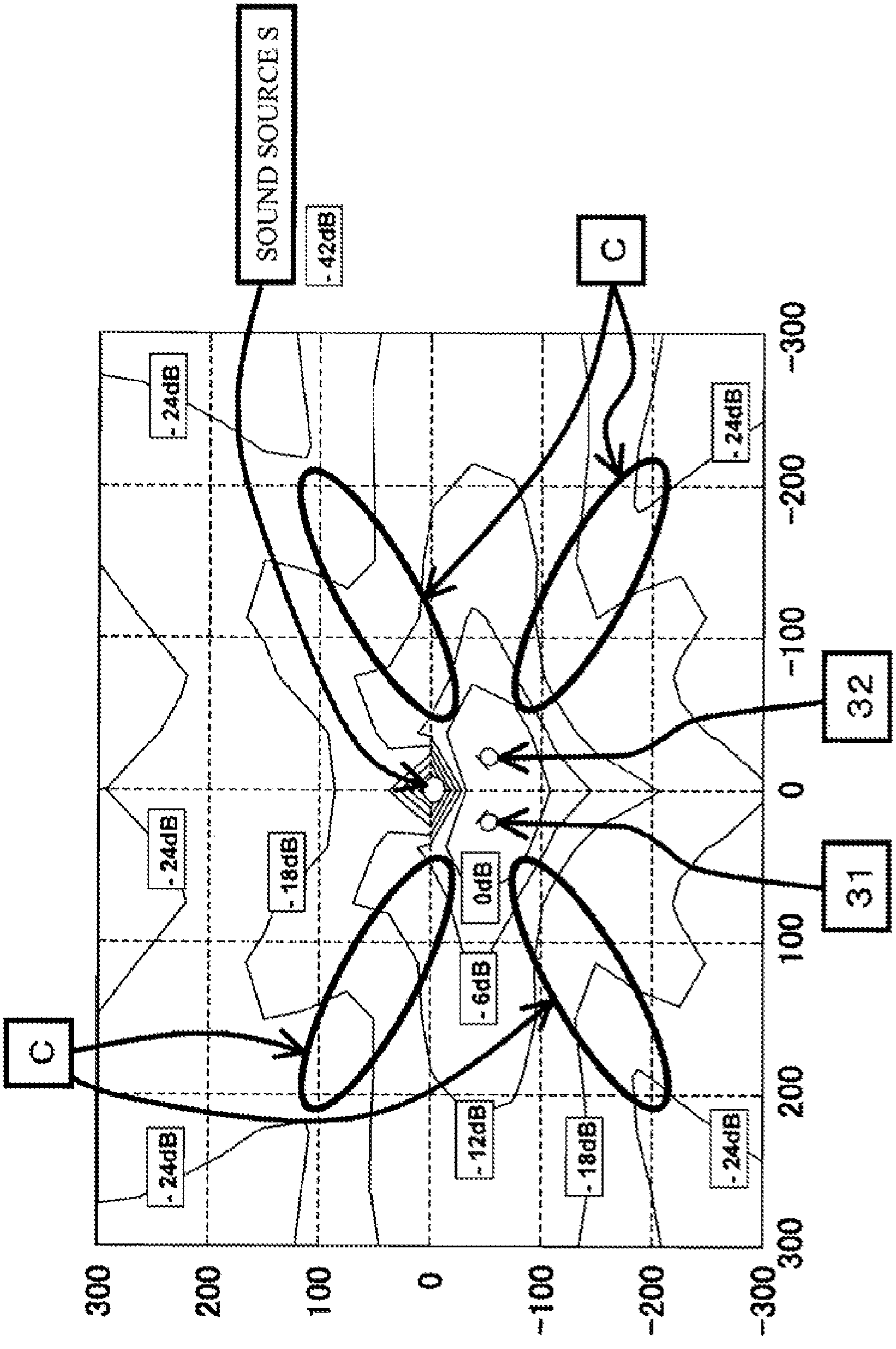
FIG. 6 is a diagram illustrating a sensitivity distribution represented by a sensitivity suppression signal obtained through addition based on a time-domain.

FIG. 6 is a diagram illustrating a sensitivity distribution represented by the sensitivity suppression signal (M31(*n*)+M32(*n*)) obtained through the addition based on the time-domain. In FIG. 6, the first non-target sound collection section 31 and the second non-target sound collection section 32 are positioned such that the sound source S positioned at a position represented as coordinates (0, 0) is in front thereof. As shown in FIG. 6, the sensitivity to the sound generated from the sound source S is −42 dB, and the sensitivity is substantially reduced in a narrow region near the sound source S. The region corresponds to the region B1 shown in FIG. 4. The region C shown in FIG. 6 is a region in which the unexpected reduction in sensitivity occurs due to phase interference caused by the time-domain sensitivity suppression signal being obtained. Further, as can be seen from the sensitivity distribution shown in FIG. 6, the number of the regions C is four, and the four regions C are distributed radially from the first non-target sound collection section 31 and the second non-target sound collection section 32. Thus, it can be seen that, although the sensitivity suppression signal including the phase information, such as the sensitivity suppression signal obtained through the addition based on the time-domain, enables the sensitivity to be suppressed in the region B1 in which the dead zones overlap each other, as compared to in the region surrounding the region B1, the unexpected reduction of the sensitivity may occur in the regions C.

Figure 7:
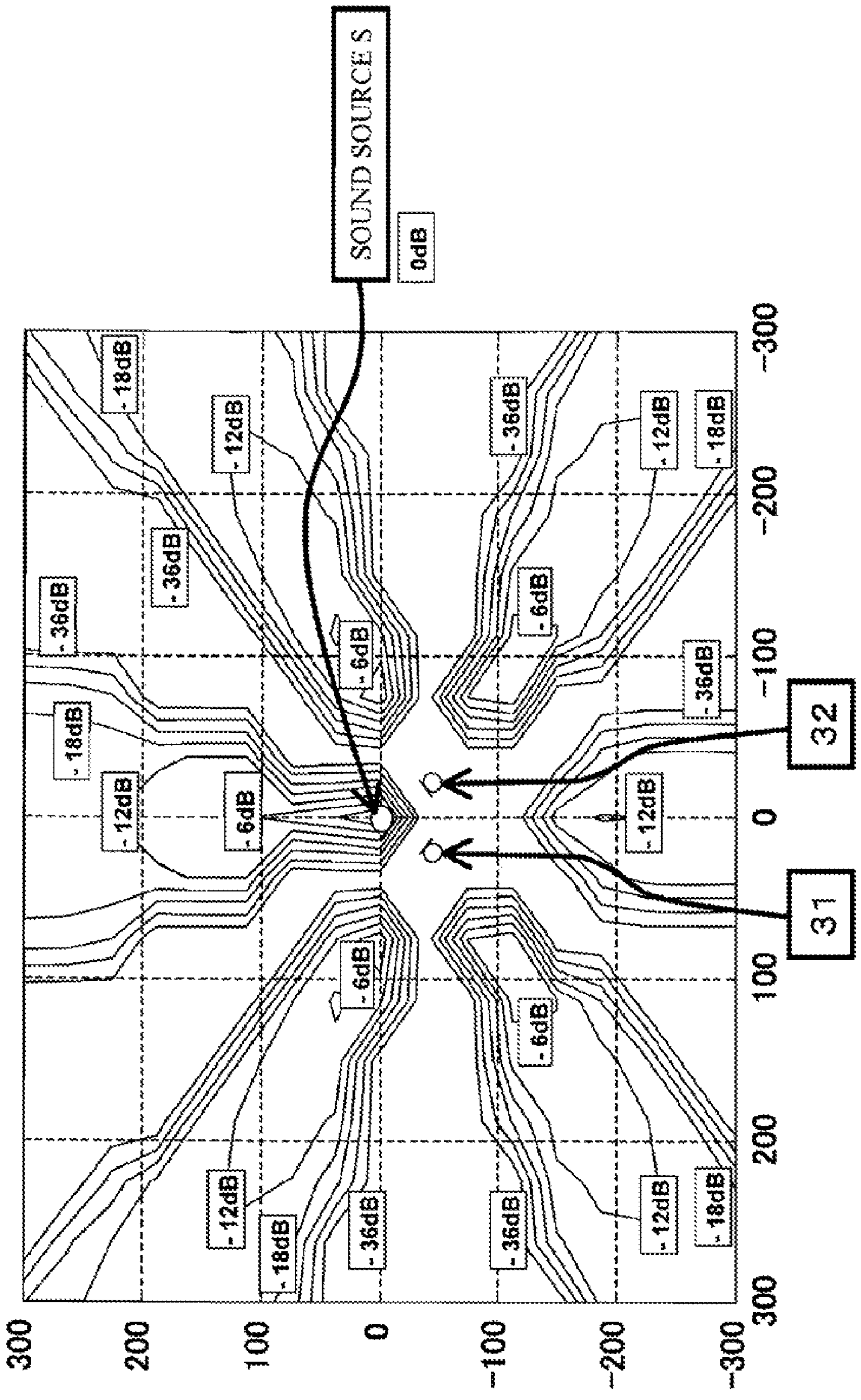
FIG. 7 is a diagram illustrating a sensitivity distribution represented by a signal extracted by removing, from the output signal of the signal addition section 20 representing the sensitivity distribution shown in FIG. 5, the sensitivity suppression signal representing the sensitivity distribution shown in FIG. 6.

FIG. 7 is a diagram illustrating a sensitivity distribution represented by a signal extracted by removing, from the output signal of the signal addition section 20 representing the sensitivity distribution shown in FIG. 5, the sensitivity suppression signal representing the sensitivity distribution shown in FIG. 6. In FIG. 7, the first non-target sound collection section 31 and the second non-target sound collection section 32 are positioned such that the sound source S positioned at a position represented as coordinates (0, 0) is in front thereof. As shown in FIG. 7, the sensitivity to the sound generated from the sound source S is 0 dB, and the sensitivity is enhanced in a narrow region near the sound source S. The region corresponds to the region B1 shown in FIG. 4. Therefore, as can be seen from the sensitivity distribution shown in FIG. 7, a signal outputted by the target sound extraction section 50 is obtained by extracting a sound generated in the region B1 in which the dead zones overlap each other. As can be seen from FIG. 7, the sensitivity is enhanced also in regions corresponding to the regions C shown in FIG. 6 although the sensitivity is lower than that in the region corresponding to the region B1.

Figure 8:
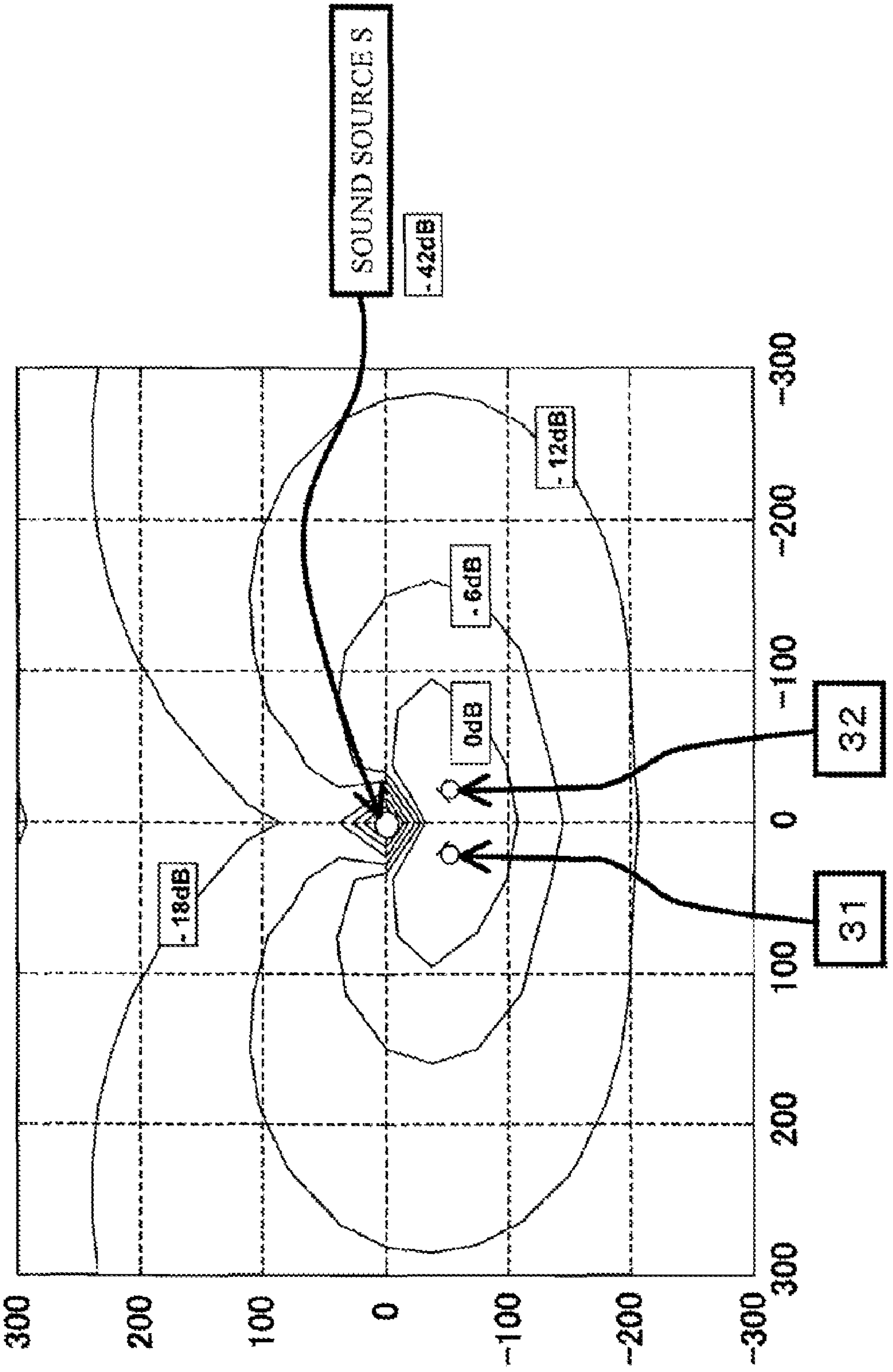
FIG. 8 is a diagram illustrating a sensitivity distribution represented by the sensitivity suppression signal obtained through addition based on an amplitude level or a power level.

FIG. 8 is a diagram illustrating a sensitivity distribution represented by the sensitivity suppression signal obtained through the addition based on the amplitude level or the power level. In FIG. 8, the first non-target sound collection section 31 and the second non-target sound collection section 32 are positioned such that the sound source S positioned at a position represented as coordinates (0, 0) is in front thereof. As shown in FIG. 8, the sensitivity to the sound generated from the sound source S is −42 dB, and the sensitivity is substantially reduced in a narrow region near the sound source S. The region corresponds to the region B1 shown in FIG. 4. In FIG. 8, the regions C as shown in FIG. 6 do not appear. This is because the sensitivity suppression signal includes no phase information. Thus, the sensitivity suppression signal based on the amplitude level or the power level enables the sensitivity to be suppressed in the region B1 in which the dead zones overlap each other, as compared to in the region surrounding the region B1, and enables prevention of the unexpected reduction of sensitivity in the surrounding region.

Figure 9:
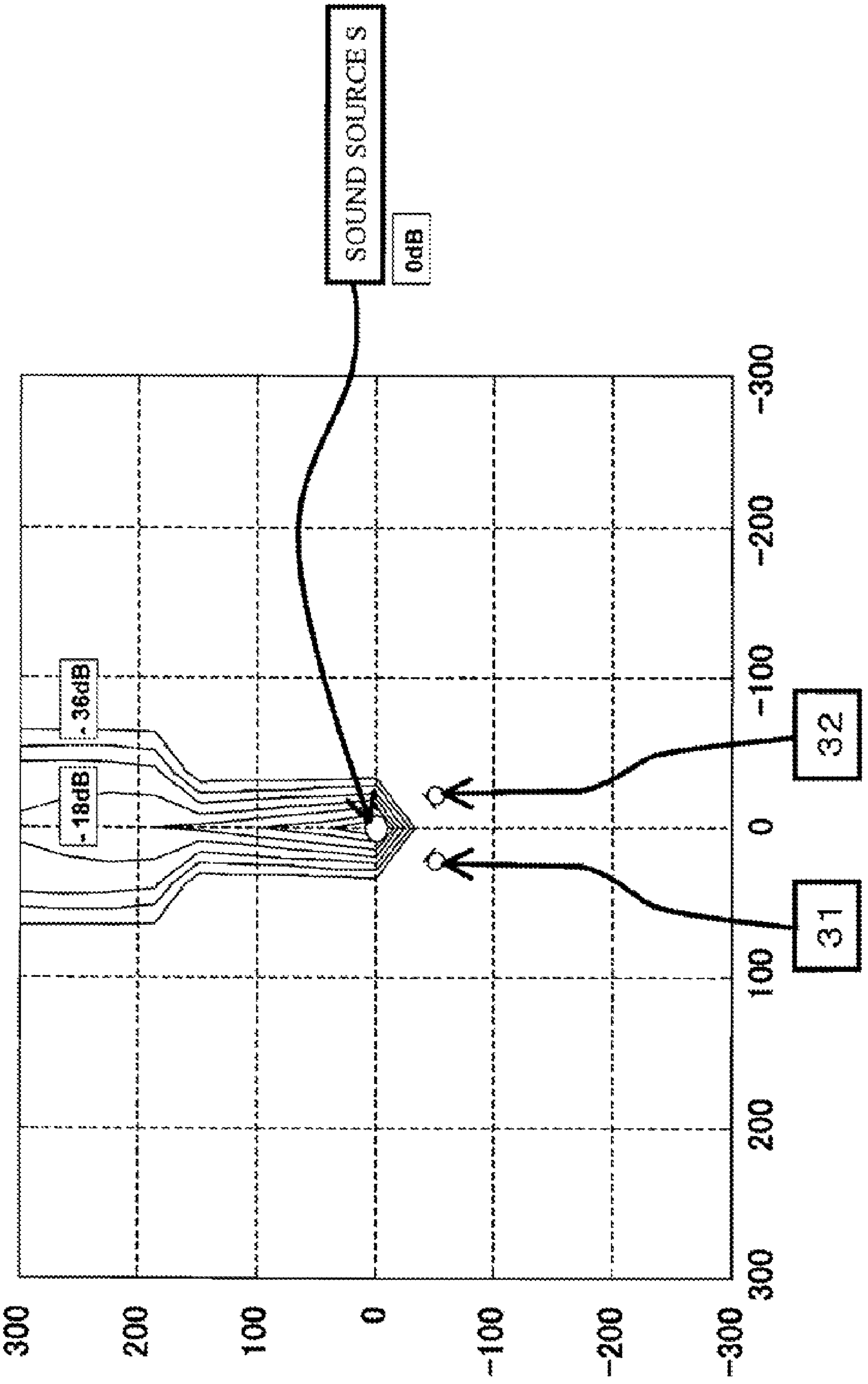
FIG. 9 is a diagram illustrating a sensitivity distribution represented by a signal extracted by removing, from the output signal of the signal addition section 20 representing the sensitivity distribution shown in FIG. 5, the sensitivity suppression signal representing a sensitivity distribution shown in FIG. 8.

FIG. 9 is a diagram illustrating a sensitivity distribution represented by a signal extracted by removing, from the output signal of the signal addition section 20 representing the sensitivity distribution shown in FIG. 5, the sensitivity suppression signal representing the sensitivity distribution shown in FIG. 8. In FIG. 9, the first non-target sound collection section 31 and the second non-target sound collection section 32 are positioned such that the sound source S positioned at a position represented as coordinates (0, 0) is in front thereof. As shown in FIG. 9, the sensitivity to the sound generated from the sound source S is 0 dB, and the sensitivity is enhanced in a narrow region near the sound source S. The region corresponds to the region B1 shown in FIG. 4. Therefore, as can been seen from the sensitivity distribution shown in FIG. 9, a signal outputted by the target sound extraction section 50 is obtained by extracting a sound generated in the region B1 in which the dead zones overlap each other. Comparing FIG. 9 with FIG. 7, in FIG. 9, the sensitivity is more sufficiently reduced in the regions other than the region B1.

As described above, the sound collection apparatus according to the present embodiment is configured such that, by utilizing the region B1 in which the dead zone formed by the first non-target sound collection section 31 and the dead zone formed by the second non-target sound collection section 32 overlap each other, a sound generated in the region B1 is eventually extracted. The region B1 is a region which is narrower than a region in which main beams overlap each other. Therefore, the sound generated from the target sound source S can be extracted in an increasingly narrowed region. As a result, the sound generated from the target sound source S can be collected with enhanced accuracy.

Further, when the sound collection apparatus according to the present embodiment uses, as the sensitivity suppression signal, a signal obtained through the addition based on the amplitude level or the power level, phase interference can be prevented. Thus, in regions other than the region B1, a contour represented by the sensitivity distribution of the sensitivity suppression signal can be conformed, with enhanced accuracy, to a contour represented by the sensitivity distribution of the output signal of the signal addition section 20. As a result, a sensitivity of a signal extracted by the target sound extraction section 50 to a disturbing sound generated in the regions other than the region B1 can be securely reduced.

Figure 10:
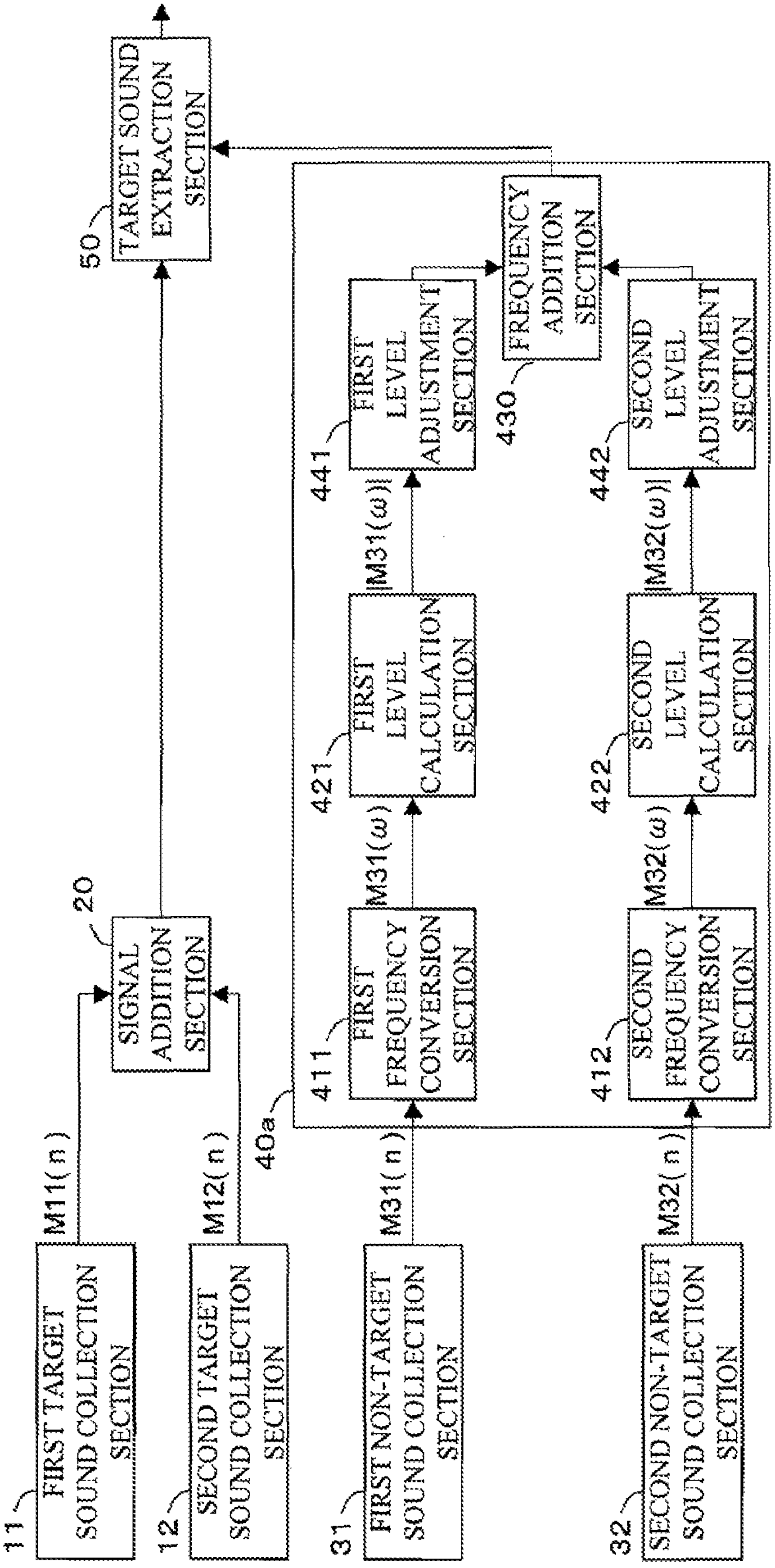
FIG. 10 is a diagram illustrating a configuration of a sound collection apparatus including a sensitivity suppression processing section 40*a* which has a structure different from a sensitivity suppression processing section 40.

The sensitivity suppression processing section 40 shown in FIG. 1 may be configured as shown in FIG. 10. FIG. 10 is a diagram illustrating a configuration of a sound collection apparatus including the sensitivity suppression processing section 40*a* which has a structure different from the sensitivity suppression processing section 40. The sound collection apparatus shown in FIG. 10 has the same configuration as shown in FIG. 1 except that the sensitivity suppression processing section 40 is replaced with the sensitivity suppression processing section 40*a*. Therefore, no description is given for the respective components other than the sensitivity suppression processing section 40*a*.

The sensitivity suppression processing section 40*a* has the same structure as the sensitivity suppression processing section 40 except that the sensitivity suppression processing section 40*a* further includes a first level adjustment section 441, and a second level adjustment section 442. The first level adjustment section 441 adjusts, for each frequency ω, the amplitude level |M31(ω)| calculated by the first level calculation section 421. The second level adjustment section 442 adjusts, for each frequency ω, the amplitude level |M32(ω)| calculated by the second level calculation section 422. Each of the first level adjustment section 441 and the second level adjustment section 442 may perform the adjustment by using an adjustment amount which is different for each frequency ω, or perform the adjustment by using the same adjustment amount. The amplitude level obtained through the adjustment performed by the first level adjustment section 441 and the amplitude level obtained through the adjustment performed by the second level adjustment section 442 are outputted to the frequency addition section 430. Each of the first level adjustment section 441 and the second level adjustment section 442 may adjust the power level instead of the amplitude level.

In the configuration shown in FIG. 10, the first level adjustment section 441 and the second level adjustment section 442 may adjust the amplitude level or the power level. Thus, the sensitivity suppression signal can be used so as to suppress the sensitivity in the region B1 in which the dead zones overlap each other, and represent, in any contour, the sensitivity distribution in other regions. Therefore, the first level adjustment section 441 and the second level adjustment section 442 can be used so as to conform, in regions other than the region B1, a contour of the sensitivity distribution of the sensitivity suppression signal to a contour of the sensitivity distribution of the output signal of the signal addition section 20, with enhanced accuracy. As a result, the target sound extraction section 50 is allowed to have an improved performance of removing a disturbing sound generated in the regions other than the region B1.

Figure 11:
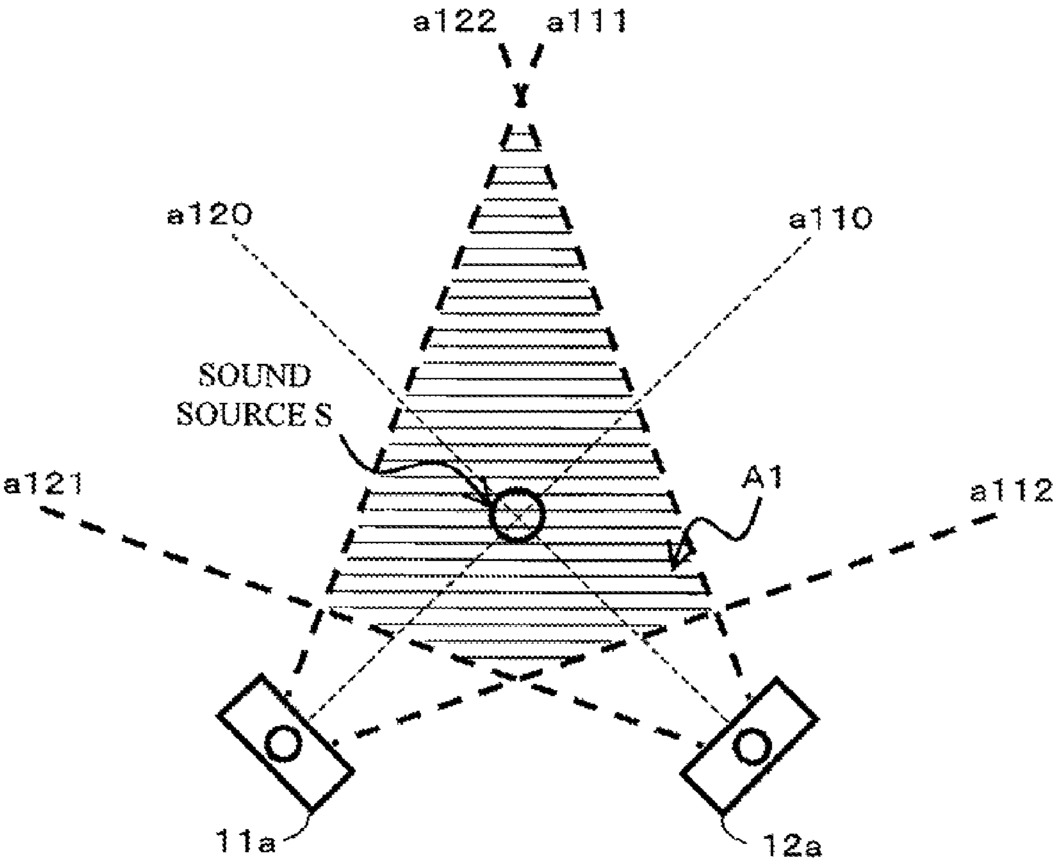
FIG. 11 is a diagram illustrating an exemplary positioning of a first target sound collection section 11*a* and a second target sound collection section 12*a* each of which is configured as a microphone array having directivity.
Figure 12:
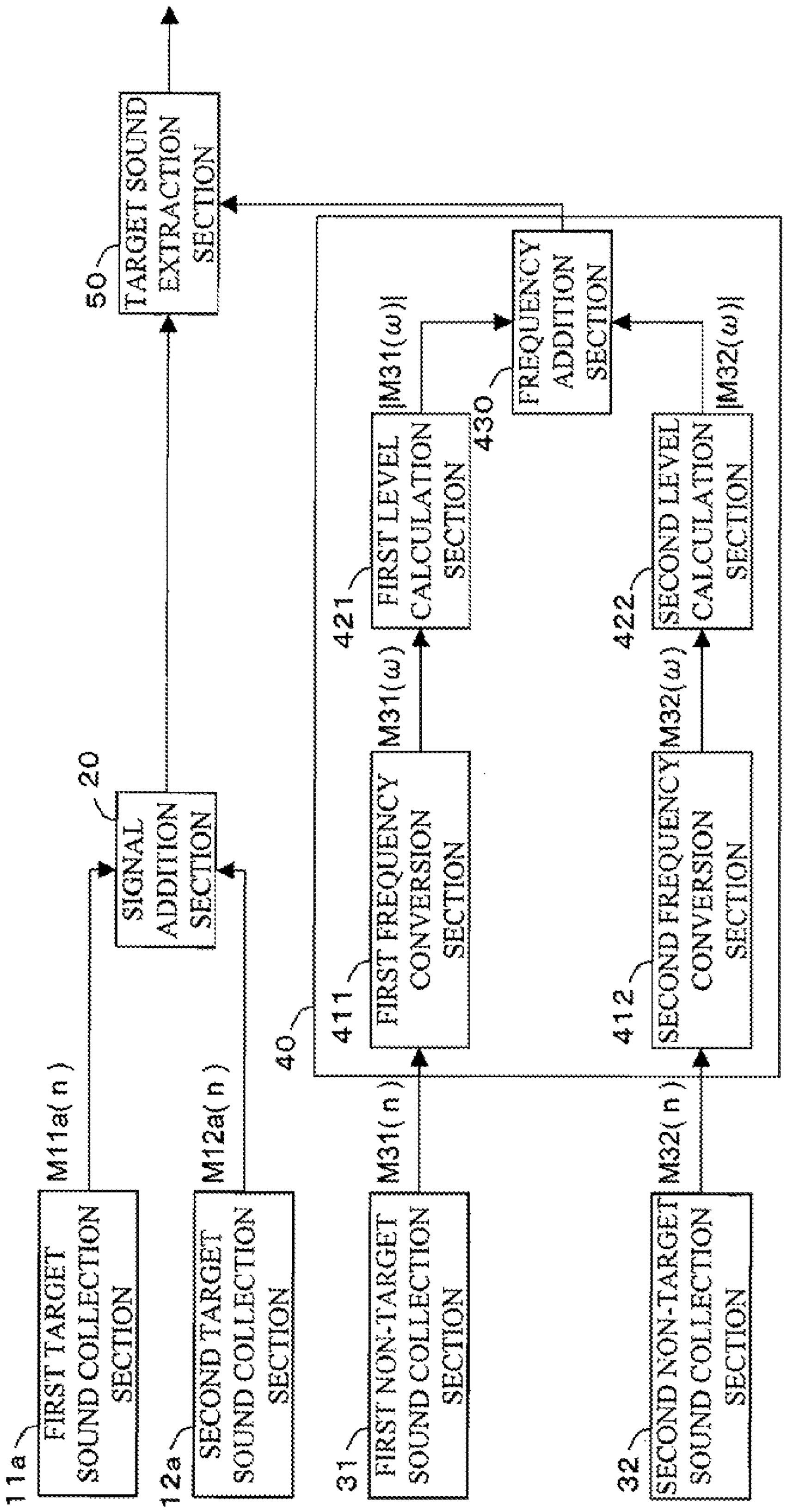
FIG. 12 is a diagram illustrating an exemplary configuration of the sound collection apparatus including the first target sound collection section 11*a* and the second target sound collection section 12*a*.

Although the first target sound collection section 11 and the second target sound collection section 12, both of which are shown in FIG. 1, are each configured as the microphone array having omnidirectional characteristic, the present invention is not limited thereto. Each of the first target sound collection section 11 and the second target sound collection section 12 may be configured as the microphone array having directivity. The microphone array having directivity may include a plurality of microphones, and also include an acoustic circuit or an electric circuit for intentionally enhancing the sensitivity in a specific direction. Further, the directivity may be either unidirectional or superdirective. FIG. 11 is a diagram illustrating an exemplary positioning of the first target sound collection section 11*a* and the second target sound collection section 12*a* each of which is configured as the microphone array having directivity. FIG. 12 is a diagram illustrating an exemplary configuration of the sound collection apparatus including the first target sound collection section 11*a* and the second target sound collection section 12*a*. The configuration shown in FIG. 12 is the same as the configuration shown in FIG. 1 except that the configuration shown in FIG. 12 includes the first target sound collection section 11*a* and the second target sound collection section 12*a* instead of the first target sound collection section 11 and the second target sound collection section 12, respectively. Therefore, no description is given for the respective components other than the first target sound collection section 11*a* and the second target sound collection section 12*a*.

In FIG. 11, the first target sound collection section 11*a* is provided such that the sound source S is positioned on a primary axis a110 representing the directivity of the first target sound collection section. A secondary axis a111 and a secondary axis a112 are each an axis oriented such that sensitivities are each −6 dB when a sensitivity to a sound received from the direction indicated by the primary axis a110 is 0 dB. A range between the secondary axis a111 and the secondary axis a112 is a range in which the first target sound collection section 11*a* indicates a sensitivity of −6 dB or more, and is a range of a main beam of the first target sound collection section 11*a*. The range of the main beam, which corresponds to the width of the main beam, represents an angular width between the secondary axis a111 and the secondary axis a112, and varies depending on an acuteness represented by the directivity of the first target sound collection section 11*a*. The second target sound collection section 12*a* is positioned such that the sound source S is positioned on a primary axis a120 representing the directivity of the second target sound collection section. A secondary axis a121 and a secondary axis a122 are each an axis oriented such that sensitivities are each −6 dB when a sensitivity to a sound received from the direction indicated by the primary axis a120 is 0 dB. A range between the secondary axis a121 and the secondary axis a122 is a range in which the second target sound collection section 12*a* indicates a sensitivity of −6 dB or more, and is a range of a main beam of the second target sound collection section 12*a*. The range of the main beam, which corresponds to the width of the main beam, represents an angular width between the secondary axis a121 and the secondary axis a122, and varies depending on an acuteness represented by the directivity of the second target sound collection section 12*a*. The region A1 indicated by the horizontal lines is an overlap region in which a main beam formed between the secondary axis a111 and the secondary axis a112 and a main beam formed between the secondary axis a121 and the secondary axis a122 overlap each other.

In FIG. 12, the collected-sound signal M11*a*(*n*) collected by the first target sound collection section 11*a* is outputted to the signal addition section 20. The collected-sound signal M12*a*(*n*) collected by the second target sound collection section 12*a* is outputted to the signal addition section 20. The signal addition section 20 adds the collected-sound signal M11*a*(*n*) and the collected-sound signal M12*a*(*n*), and outputs, to the target sound extraction section 50, a signal (M11*a*(*n*)+M12*a*(*n*)) obtained through the addition. The signal obtained through the addition performed by the signal addition section 20 is a signal obtained by combining directivities, and is a signal representing the sensitivity distribution in which the sensitivity is enhanced in the region A1 shown in FIG. 11.

Thus, when the first target sound collection section 11*a* and the second target sound collection section 12*a*, each of which has directivity, is used, the distribution of the sensitivity of the output signal from the signal addition section 20 is a distribution in which the sensitivity is enhanced in the region A1. Thus, a contour of the sensitivity distribution represented by the output signal of the signal addition section 20 can be conformed to a contour of the sensitivity distribution represented by the sensitivity suppression signal more accurately than in the configuration shown in FIG. 1. As a result, the target sound extraction section 50 is allowed to have an improved performance of removing a disturbing sound generated in regions other than the region B1. Further, the enhancement of the sensitivity in the region A1 eventually leads to enhancement of the sound collection sensitivity for a target sound.

Although in the configuration shown in FIG. 1 the first target sound collection section 11 and the second target sound collection section 12 are provided as a target sound collection section, the present invention is not limited thereto. A target sound collection section having the same function as the first target sound collection section 11 or the second target sound collection section 12 may be additionally provided. That is, the sound collection apparatus shown in FIG. 1 may comprise three or more target sound collection sections. The collected-sound signals outputted from a plurality of the target sound collection sections are added by the signal addition section 20. A signal obtained through the addition is outputted to the target sound extraction section 50. Further, one of the first target sound collection section 11 or the second target sound collection section 12 may be eliminated. That is, the sound collection apparatus of the present embodiment may comprise at least one target sound collection section. In this case, it is unnecessary to provide the signal addition section 20, and the collected-sound signal is outputted by the target sound collection section directly to the target sound extraction section 50.

Figure 13:
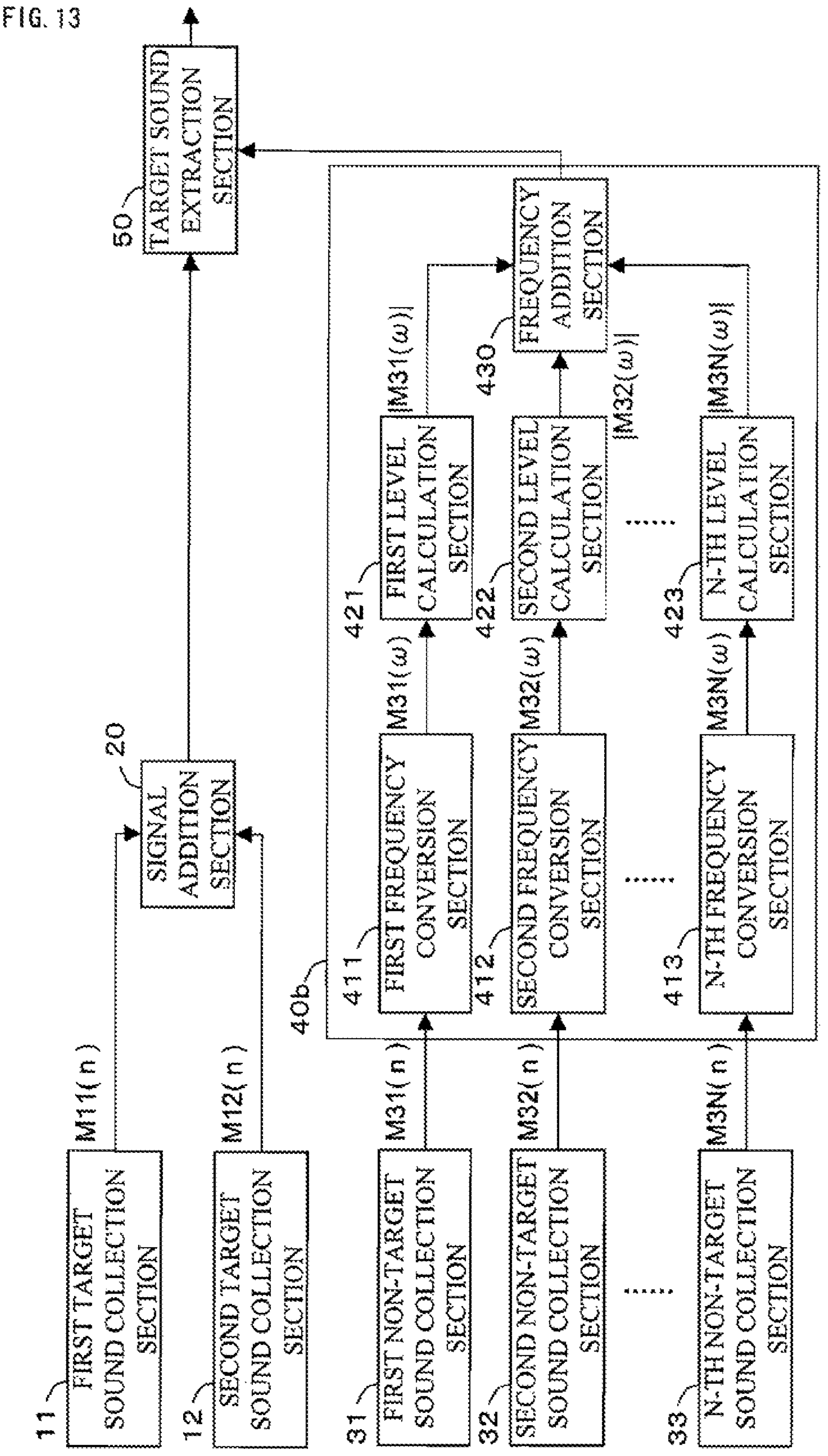
FIG. 13 is a diagram illustrating an exemplary configuration of a sound collection apparatus comprising a plurality of the non-target sound collection sections.

Although in the configuration shown in FIG. 1 the first non-target sound collection section 31 and the second non-target sound collection section 32 are provided as a non-target sound collection section, the present invention is not limited thereto. A non-target sound collection section having the same function as the first non-target sound collection section 31 or the second non-target sound collection section 32 may be additionally provided. That is, the sound collection apparatus of the present embodiment may comprise at least two non-target sound collection sections so as to form the region B1 in which the dead zones overlap each other. In this case, each of the non-target sound collection sections are positioned so as to form the dead zone in the direction of the target sound source S. FIG. 13 is a diagram illustrating an exemplary configuration of the sound collection apparatus comprising a plurality of the non-target sound collection sections.

The sound collection apparatus shown in FIG. 13 has the same configuration as the sound collection apparatus shown in FIG. 1 except that, in the sound collection apparatus shown in FIG. 13, a first non-target sound collection section 31, a second non-target sound collection section 32, . . . , an N-th non-target sound collection section 33 are provided instead of the first non-target sound collection section 31 and the second non-target sound collection section 32, and a sensitivity suppression processing section 40*b* is provided instead of the sensitivity suppression processing section 40. N is a natural number greater than or equal to three. The sensitivity suppression processing section 40*b* includes a first frequency conversion section 411, a second frequency conversion section 412, . . . , an N-th frequency conversion section 413, a first level calculation section 421, a second level calculation section 422, . . . , an N-th level calculation section 423, and a frequency addition section 430, as shown in FIG. 13. The collected-sound signal M3N(n) outputted by the N-th non-target sound collection section 33 is outputted to the N-th frequency conversion section 413. The collected-sound signal M3N(ω) obtained through conversion to a frequency-domain signal by the N-th frequency conversion section 413 is outputted to the N-th level calculation section 423. The amplitude level |M3N(ω)| obtained through calculation performed for each frequency by the N-th level calculation section 423 is outputted to the frequency addition section 430. The frequency addition section 430 adds, for each frequency, an amplitude level outputted by the first level calculation section 421, an amplitude level outputted by the second level calculation section 422, . . . , an amplitude level outputted by the N-th level calculation section 423. The subsequent process is the same as described with reference to FIG. 1, and the description thereof is not given.

Although in FIG. 3 a pattern of the directivity of each of the first non-target sound collection section 31 and the second non-target sound collection section 32 represents bidirectional characteristic, the pattern may be another one. Another pattern representing directivity may be, for example, cardioid pattern, hypercardioide pattern, or the like. From the viewpoint of the dead zone of the sensitivity, the dead zone represented by the bidirectional pattern is narrowest of all the dead zones represented by the patterns described above. Therefore, since the region B1 shown in FIG. 4 can be increasingly narrowed, it is preferable to use the bidirectional pattern. Further, a method for forming each of the patterns representing the aforementioned directivity includes a method for performing subtraction type (sound pressure gradient type) directivity synthesis, and a method for performing addition type (waveform synthesis type) directivity synthesis.

The first non-target sound collection section 31 and the second non-target sound collection section 32 may be configured such that an acoustic circuit or an electric circuit can be used, as necessary, to change a direction in which the dead zone is formed. Thus, the region in which the dead zones overlap each other may be formed so as to include another sound source positioned at another different position, without changing a position at which each of the first non-target sound collection section 31 and the second non-target sound collection section 32 is provided.

(Second Embodiment)

Hereinafter, a sound collection apparatus according to a second embodiment of the present invention will be described. The sound collection apparatus of the present embodiment has the same configuration as shown in FIG. 12 except that, in the sound collection apparatus of the present embodiment, the directions of the primary axis a110 and the primary axis a120 of the dead zones shown in FIG. 11 are different from those of the configuration shown in FIG. 12. Hereinafter, the difference will be mainly described.

Figure 14:
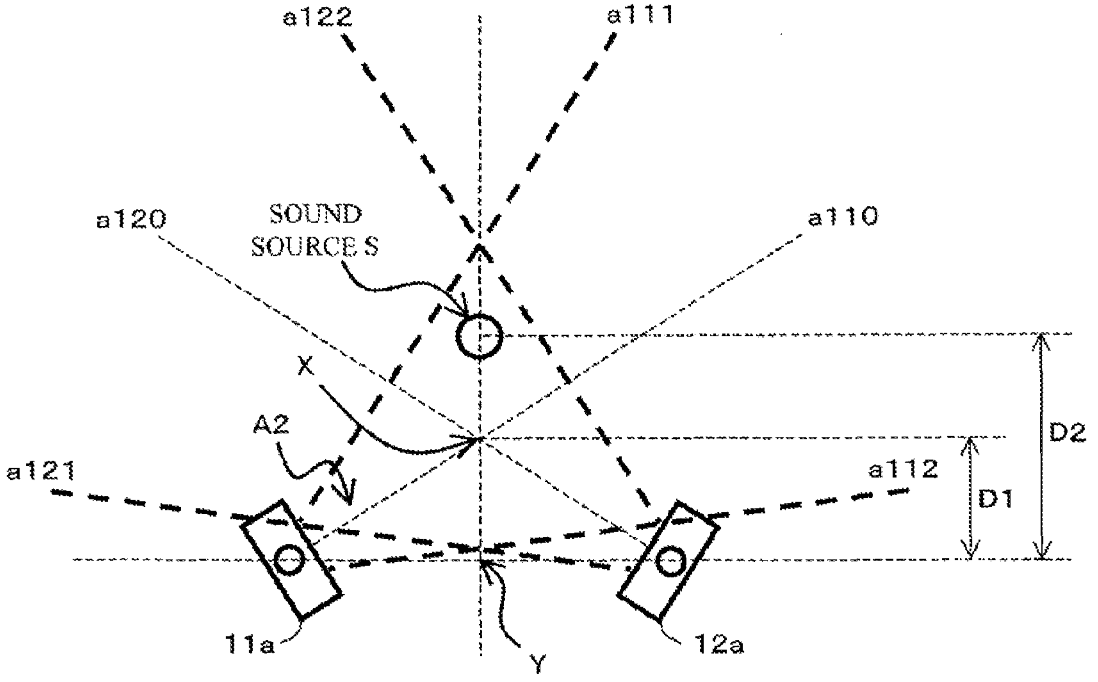
FIG. 14 is a diagram illustrating an exemplary positioning of the first target sound collection section 11*a* and the second target sound collection section 12*a*, each of which is configured as a microphone array having directivity, according to a second embodiment.

FIG. 14 is a diagram illustrating an exemplary positioning of the first target sound collection section 11*a* and the second target sound collection section 12*a*, each of which is configured as a microphone array having directivity, according to the second embodiment. The first target sound collection section 11*a* and the second target sound collection section 12*a* are positioned such that the sound source S is in front thereof, as shown in FIG. 14. "Front" refers to the top of the drawing sheet of FIG. 14.

As shown in FIG. 14, the first target sound collection section 11*a* is provided so as to position a primary axis a110 representing the directivity of the first target sound collection section 11*a* off the sound source S toward the second target sound collection section 12*a*. The second target sound collection section 12*a* is provided so as to position a primary axis a120 representing the directivity of the second target sound collection section 12*a* off the sound source S toward the first target sound collection section 11*a*. The region A2 shown in FIG. 14 is an overlap region in which a main beam formed between a secondary axis a111 and a secondary axis a112, and a main beam formed between a secondary axis a121 and a secondary axis a122 overlap each other. A point Y shown in FIG. 14 is a middle point between the first target sound collection section 11*a* and the second target sound collection section 12*a*. A point X shown in FIG. 14 is a point at which the primary axis a120 intersects the primary axis 110. The distance from the point Y to the point X is represented as D1, and the distance from the point Y to the sound source is represented as D2. In this case, the first target sound collection section 11*a* and the second target sound collection section 12*a* are positioned so as to satisfy D1<D2.

Figure 15:
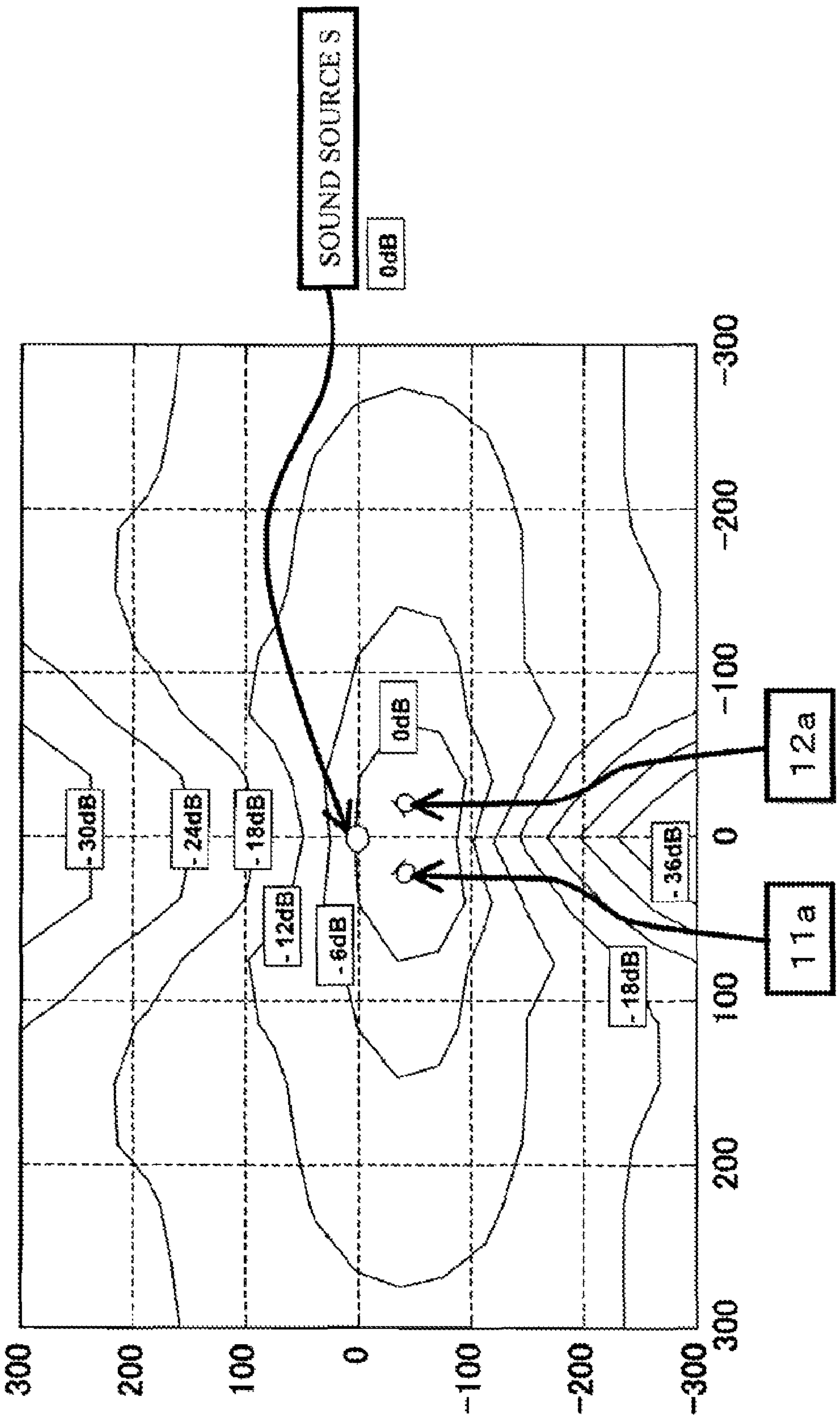
FIG. 15 is a diagram illustrating a simulation result for a sensitivity distribution represented by the output signal of the signal addition section 20 when the first target sound collection section 11*a* and the second target sound collection section 12*a* are positioned at a position shown in FIG. 14.

When the first target sound collection section 11*a* and the second target sound collection section 12*a* are positioned as shown in FIG. 14, the sensitivity distribution represented by the output signal from the signal addition section 20 is as shown in FIG. 15. FIG. 15 is a diagram illustrating the sensitivity distribution which is represented by the output signal of the signal addition section 20 when the first target sound collection section 11*a* and the second target sound collection section 12*a* are positioned at positions shown in FIG. 14. In FIG. 15, the ordinate axis and the abscissa axis are coordinate axes each representing a distance (cm). Further, in FIG. 15, the sound source S is positioned at a position represented as coordinates (0, 0). Furthermore, in FIG. 15, the solid lines on the coordinate system are obtained by connecting coordinates at which the same sound pressure sensitivity is obtained, and are spaced at intervals of 6 dB. Still further, in FIG. 15, the first target sound collection section 11*a* and the second target sound collection section 12*a* are positioned such that the sound source S positioned at a position represented as coordinates (0, 0) is in front thereof.

Comparison between the sensitivity distribution shown in FIG. 15 and the sensitivity distribution shown in FIG. 5 indicates that in the sensitivity distribution shown in FIG. 15 the sensitivity is reduced in the forward direction (the positive direction of the ordinate axis) from the sound source S. Thus, a contour represented by the sensitivity distribution shown in FIG. 15 is conformed, with enhanced accuracy, to a contour represented by the sensitivity distribution shown in each of FIGS. 6 and 8 in the forward direction from the sound source S.

Figure 16:
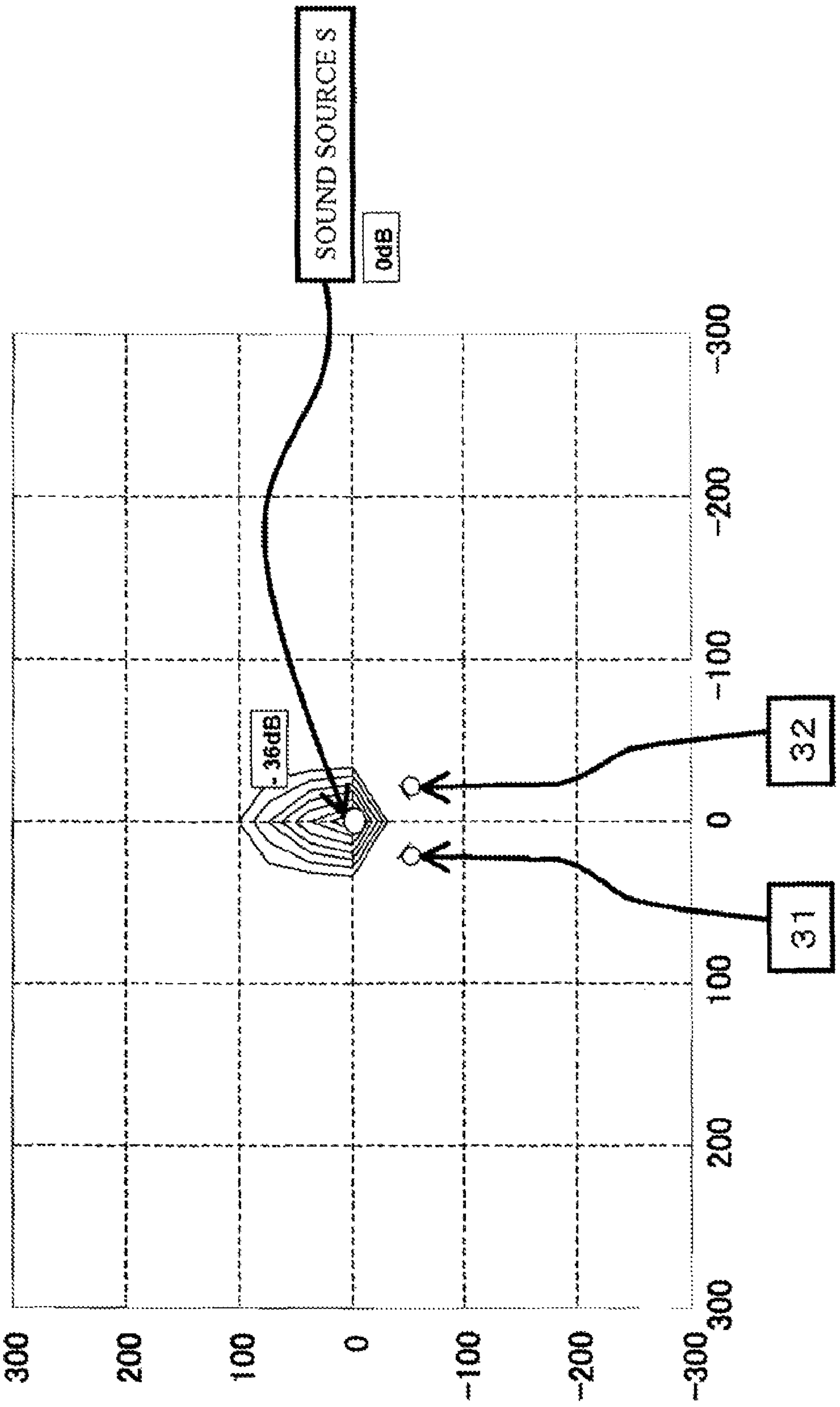
FIG. 16 is a diagram illustrating a sensitivity distribution represented by a signal extracted by removing, from the output signal of the signal addition section 20 representing the sensitivity distribution shown in FIG. 15, the sensitivity suppression signal representing the sensitivity distribution shown in FIG. 8.

FIG. 16 is a diagram illustrating a sensitivity distribution represented by a signal extracted by removing, from the output signal of the signal addition section 20 representing the sensitivity distribution shown in FIG. 15, the sensitivity suppression signal representing the sensitivity distribution shown in FIG. 8. In FIG. 16, the first non-target sound collection section 31 and the second non-target sound collection section 32 are positioned such that the sound source S positioned at a position represented as coordinates (0, 0) is in front thereof. As shown in FIG. 16, the sensitivity to a sound generated from the sound source S is 0 dB, and the sensitivity is enhanced in a narrow region near the sound source S. The region corresponds to the region B1 shown in FIG. 4. Therefore, as can be seen from the sensitivity distribution shown in FIG. 16, a signal outputted by the target sound extraction section 50 is a signal obtained by extracting a sound generated in the region B1. Further, the sensitivity is prevented from being enhanced in the forward direction from the sound source S.

As described above, in the sound collection apparatus according to the present embodiment, the first target sound collection section 11*a* and the second target sound collection section 12*a* are positioned such that, in regions other than the region B1, a contour represented by the sensitivity distribution of the output signal from the signal addition section 20 is conformed to a contour represented by the sensitivity distribution of the sensitivity suppression signal. The contour represented by the sensitivity distribution shown in FIG. 15 is conformed, with enhanced accuracy, to the contour represented by the sensitivity distribution shown in each of FIGS. 6 and 8 in the forward direction from the sound source S.

Thus, in the sensitivity distribution, as shown in FIG. 16, of a signal extracted by the target sound extraction section 50, the sensitivity is allowed to be sufficiently reduced also in the forward direction from the sound source S. Further, the sensitivity distribution shown in FIG. 15 represents a contour representing the sensitivity reduced in the forward direction from the sound source S. Therefore, the sensitivity distribution itself shown in FIG. 15 also enables a signal to be extracted by the target sound extraction section 50 by sufficiently reducing the sensitivity in the forward direction from the sound source S.

The sound collection apparatus according to each of the first and second embodiments described above can be realized as an information processing apparatus, such as a typical computer system, in which the collected-sound signal outputted from each of the first target sound collection section 11 and the second target sound collection section 12, and the collected-sound signal outputted from each of the first non-target sound collection section 31 and the second non-target sound collection section 32 are received so as to output a processed signal. The computer system includes, for example, a microprocessor, a ROM and a RAM. A program for causing the computer system to execute processing which are to be performed by the signal addition section 20, the sensitivity suppression processing section 40, the target sound extraction section 50, and the like, which are described above, is stored in a predetermined information storage medium. The computer system reads and executes the program stored in the predetermined information storage medium so as to realize functions of the signal addition section 20, the sensitivity suppression processing section 40, the target sound extraction section 50, and the like, which are described above. The program includes a plurality of command codes, combined with each other, for providing instructions to a computer, so as to achieve a predetermined function. Further, the information storage medium for storing the program may be, for example, a flexible disk, a hard disk, a CD-ROM, an MO, a DVD, a DVD-ROM, a DVD-RAM, a BD (Blu-ray Disc), and a semiconductor memory. Further, the program may be supplied to the information processing apparatus through another medium or a communication line. Furthermore, the program may be supplied to another information processing apparatus through another medium or a communication line.

The respective components or a portion of the components of the sound collection apparatus of each of the first and the second embodiments described above may be configured as an IC card or an independent module detachably mounted on the sound collection apparatus. The IC card or the module is a computer system including a microprocessor, a ROM, a RAM, and the like. The IC card and the module may be tamper-resistant.

In the sound collection apparatus according to each of the first and the second embodiments described above, the respective components may be realized in a chip form by using an integrated circuit such as an LSI (Large Scale Integration), and/or a dedicated signal processing circuit except for components, such as the first target sound collection section 11, for collecting a sound. Further, the sound collection apparatus according to each of the first and the second embodiments described above may be realized so as to include chips for enabling the same functions as those of the respective components as described above. For example, in the configuration shown in FIG. 1, the signal addition section 20, the sensitivity suppression processing section 40, and the target sound extraction section 50 may be realized as an integrated circuit. In this case, the integrated circuit includes: two first input terminals for receiving outputs from the first target sound collection section 11 and the second target sound collection section 12; two second input terminals for receiving outputs from the first non-target sound collection section 31 and the second non-target sound collection section 32; and an output terminal for outputting an output from the target sound extraction section 50. The LSI may be referred to as an IC, a system LSI, a super LSI, or an ultra LSI, depending on the degree of integration. Further, the method of integration is not limited to LSI, and may be realized by a dedicated circuit or a general purpose processor. An FPGA (Field Programmable Gate Array), which can be programmed after an LSI is manufactured, or a reconfigurable processor enabling connection and settings of the circuit cells in the LSI to be reconfigured, may be used. Further, in the case where another integration technology replacing LSI becomes available due to improvement of a semiconductor technology or due to the emergence of another technology derived therefrom, integration of functional blocks may be performed using such a technology, as a matter of course.

The sound collection apparatus according to the present invention is capable of collecting, with enhanced accuracy, only a target sound generated from a target sound source, and also useful for, for example, an apparatus, such as a handsfree device, a communication apparatus for a conference system, and a video camera having an off-mike function.

The invention claimed is:

1. A sound collection apparatus, comprising:

at least one target sound collection means for collecting a sound including a target sound generated from a target sound source, so as to output a collected-sound signal;

a plurality of non-target sound collection means, provided at positions different from each other, forming dead zones of sensitivity in a direction of the target sound source, respectively, and forming an overlap region in which the dead zones overlap each other, so as to collect a sound outside the dead zones and output a collected-sound signal;

a sensitivity suppression means for generating a sensitivity suppression signal for suppressing a sound collection sensitivity in an overlap region in which a plurality of the dead zones overlap each other, as compared to a region surrounding the overlap region, by subjecting, to a predetermined signal processing, the collected-sound signal outputted by each of the plurality of non-target sound collection means; and an extraction means for removing, from the collected-sound signal outputted by the at least one target sound collection means, the sensitivity suppression signal generated by the sensitivity suppression means, so as to extract a signal of a sound generated in the overlap region in which the plurality of the dead zones overlap each other.

2. The sound collection apparatus according to claim 1, wherein a plurality of the collected-sound signals outputted by the plurality of non-target sound collection means are time-domain collected-sound signals, respectively, and wherein the sensitivity suppression means includes:

a conversion means for performing a conversion from the time-domain collected-sound signals outputted by the plurality of non-target sound collection means, to frequency-domain collected-sound signals, respectively;

a calculation means for performing, in units of frequencies, a calculation for obtaining amplitude levels of the frequency-domain collected-sound signals obtained through the conversion performed by the conversion means; and an addition means for performing, in units of the frequencies, an addition of the amplitude levels of the frequency-domain collected-sound signals, the amplitude levels being obtained through the calculation performed by the calculation means, and outputting, as the sensitivity suppression signal, a signal obtained through the addition.

3. The sound collection apparatus according to claim 2, wherein the sensitivity suppression means further includes adjustment means for performing, in units of the frequencies, an adjustment of the amplitude levels of the frequency-domain collected-sound signals, the amplitude levels being obtained through the calculation performed by the calculation means, wherein the addition means performs, in units of the frequencies, an addition of amplitude levels of the frequency-domain collected-sound signals, the amplitude levels being obtained through the adjustment performed by the adjustment means, and outputs, as the sensitivity suppression signal, a signal obtained through the addition, and wherein the adjustment means adjusts the amplitude levels in units of the frequencies such that a sensitivity distribution represented by the sensitivity suppression signal outputted by the addition means conforms, in a plurality of regions other than the overlap region in which the plurality of the dead zones overlap each other, to a sensitivity distribution represented by the collected-sound signal outputted by the at least one target sound collection means.

4. The sound collection apparatus according to claim 1, wherein a plurality of the collected-sound signals outputted by the plurality of non-target sound collection means are time-domain collected-sound signals, respectively, and wherein the sensitivity suppression means includes:

a conversion means for performing a conversion from the time-domain collected-sound signals outputted by the plurality of non-target sound collection means, to frequency-domain collected-sound signals, respectively;

a calculation means for performing, in units of frequencies, a calculation for obtaining power levels of the frequency-domain collected-sound signals obtained through the conversion performed by the conversion means; and an addition means for performing, in units of the frequencies, an addition of the power levels of the frequency-domain collected-sound signals, the power levels being obtained through the calculation performed by the calculation means, and outputting, as the sensitivity suppression signal, a signal obtained through the addition.

5. The sound collection apparatus according to claim 1, wherein a plurality of the target sound collection means are provided, wherein the plurality of the target sound collection means are provided at positions different from each other such that the target sound source is provided in front thereof, and the plurality of the target sound collection means have respective directivities each representing a direction of the target sound source, wherein the plurality of non-target sound collection means are provided at positions different from each other such that the target sound source is provided in front thereof, and wherein primary axes representing the respective directivities of the plurality of the target sound collection means intersect each other at a position off a position at which primary axes of the plurality of the dead zones of the plurality of non-target sound collection means intersect each other, toward the plurality of the target sound collection means.

6. A sound collection method, comprising:

a target sound collection step of collecting, by using a first sound collection means, a sound including a target sound generated from a target sound source, so as to output a collected-sound signal;

a positioning step of positioning a plurality of second sound collection means at positions different from each other such that the plurality of second sound collection means form dead zones of sensitivity in a direction of the target sound source, respectively, and form an overlap region in which the dead zones overlap each other;

a non-target sound collection step of collecting a sound outside the dead zones by using the plurality of second sound collection means positioned in the positioning step, so as to output collected-sound signals;

a sensitivity suppression step of generating a sensitivity suppression signal for suppressing a sound collection sensitivity in an overlap region in which a plurality of the dead zones overlap each other, as compared to a region surrounding the overlap region, by subjecting, to a predetermined signal processing, the collected-sound signals outputted in the non-target sound collection step; and extraction step of removing, from the collected-sound signal outputted in the target sound collection step, the sensitivity suppression signal generated in the sensitivity suppression step, so as to extract a signal of a sound generated in the overlap region in which the plurality of the dead zones overlap each other.

7. An integrated circuit, comprising:

a first input terminal for receiving a collected-sound signal outputted by at least one target sound collection means for collecting a sound including a target sound generated from a target sound source;

a plurality of second input terminals for receiving collected-sound signals outputted by a plurality of non-target sound collection means, respectively, wherein the plurality of non-target sound collection means are provided at positions different from each other, and form dead zones of sensitivity in a direction of the target sound source, respectively, so as to collect a sound outside the dead zones and form an overlap region in which the dead zones overlap each other;

a sensitivity suppression means for generating a sensitivity suppression signal for suppressing a sound collection sensitivity in an overlap region in which a plurality of the dead zones overlap each other, as compared to a region surrounding the overlap region, by subjecting, to a predetermined signal processing, the collected-sound signals outputted from the plurality of second input terminals, respectively;

an extraction means for removing, from the collected-sound signal outputted from the first input terminal, the sensitivity suppression signal generated by the sensitivity suppression means, so as to extract a signal of a sound generated in the overlap region in which the plurality of the dead zones overlap each other; and an output terminal for outputting the signal of the sound which is generated in the overlap region in which the plurality of the dead zones overlap each other, and is extracted by the extraction means.

8. A non-transitory computer-readable recording medium storing a program for causing a computer, of a sound collection apparatus including at least one target sound collection means for collecting a sound including a target sound generated from a target sound source, so as to output a collected-sound signal; and a plurality of non-target sound collection means, provided at positions different from each other, each forming dead zones of a sensitivity in a direction of the target sound source so as to collect a sound outside the dead zones and output a collected-sound signal, to execute:

a sensitivity suppression step of generating a sensitivity suppression signal for suppressing a sound collection sensitivity in an overlap region in which a plurality of the dead zones overlap each other, as compared to a region surrounding the overlap region, by subjecting, to a predetermined signal processing, the collected-sound signal outputted by each of the plurality of non-target sound collection means; and an extraction step of removing, from the collected-sound signal outputted by the at least one target sound collection means, the sensitivity suppression signal generated in the sensitivity suppression step, so as to extract a signal of a sound generated in the overlap region in which the plurality of the dead zones overlap each other.

* * * * *

UNITED STATES PATENT AND TRADEMARK OFFICE

CERTIFICATE OF CORRECTION

PATENT NO. : 8,189,806 B2
APPLICATION NO. : 12/092396
DATED : May 29, 2012
INVENTOR(S) : Shin-ichi Yuzuriha et al.

It is certified that error appears in the above-identified patent and that said Letters Patent is hereby corrected as shown below:

In column 24, line 49 (claim 7, line 13), “sound source, respectively, so as to collect a sound” should read --sound source, respectively so as to collect a sound--.

Signed and Sealed this
Twenty-third Day of October, 2012

David J. Kappos
*Director of the United States Patent and Trademark Office*